(12) United States Patent
Ärlelid et al.

(10) Patent No.: US 10,444,338 B2
(45) Date of Patent: Oct. 15, 2019

(54) TRANSMITTER-RECEIVER SYSTEM

(71) Applicant: Acconeer AB, Lund (SE)

(72) Inventors: Mats Ärlelid, Limhamn (SE); Denis Chouvaev, Solna (SE); Mikael Egard, Lund (SE)

(73) Assignee: ACCONEER AB (SE)

( * ) Notice: Subject to any disclaimer, the term of this patent is extended or adjusted under 35 U.S.C. 154(b) by 36 days.

(21) Appl. No.: 15/123,374

(22) PCT Filed: Mar. 5, 2015

(86) PCT No.: PCT/EP2015/054678
§ 371 (c)(1),
(2) Date: Sep. 2, 2016

(87) PCT Pub. No.: WO2015/132361
PCT Pub. Date: Sep. 11, 2015

(65) Prior Publication Data
US 2018/0164419 A1    Jun. 14, 2018

(30) Foreign Application Priority Data
Mar. 6, 2014 (EP) .................................. 14445004

(51) Int. Cl.
*G01S 13/10* (2006.01)
*G01S 7/28* (2006.01)
(Continued)

(52) U.S. Cl.
CPC .............. *G01S 13/103* (2013.01); *G01S 7/28* (2013.01); *G01S 2007/4065* (2013.01)

(58) Field of Classification Search
CPC .. G01S 13/103; G01S 7/28; G01S 2007/4065; G01S 13/34; G01S 13/26;
(Continued)

(56) References Cited

U.S. PATENT DOCUMENTS 3,273,147 A * 9/1966 Herscovici ............ G01S 13/528
342/163
3,491,360 A * 1/1970 Stoorvogel ........... G01S 13/225
342/137
(Continued)

FOREIGN PATENT DOCUMENTS

CN 101231337 A 7/2008
CN 102147460 A 8/2011
(Continued)

*Primary Examiner* — Bernarr E Gregory
(74) *Attorney, Agent, or Firm* — Condo Roccia Koptiw LLP

(57) ABSTRACT

According to one aspect of the inventive concept there is provided a transmitter-receiver system comprising: a transmitter arranged to transmit a wavelet; a receiver arranged to receive a wavelet; a wavelet generator arranged to generate a reference wavelet; and timing circuitry arranged to receive a reference clock signal, output a first trigger signal for triggering transmission of a wavelet and output a second trigger signal for triggering generation of a reference wavelet. The timing circuitry further comprises a delay line including at least one delay element and being arranged to receive a signal at an input of the delay line and transmit a delayed signal at an output of the delay line, wherein a state of each delay element of at least a subset of said at least one delay elements is switchable between at least a first state and a second state. A delay element in said first state, i.e. switched to its first state, presents a first propagation delay. A delay element in said second state, i.e. switched to its second state, presents a second propagation delay which differs from the first propagation delay by a value which is smaller than a period of the reference clock signal. Thereby a total propagation delay of the delay line is configurable by controlling the state of each delay element of said subset. The system further comprises a controller arranged to control a delay between the first trigger signal and the second
(Continued)

trigger signal by controlling the total propagation delay of the delay line. The system is arranged to correlate the reference wavelet with a received wavelet for at least one setting of the total propagation delay.

21 Claims, 7 Drawing Sheets

(51) Int. Cl.
*G01S 7/40* (2006.01)
*G01S 13/00* (2006.01)

(58) Field of Classification Search
CPC ........ G01S 7/411; G01S 13/288; G01S 7/526; G01S 13/225; G01S 13/528; G06F 17/15; H04B 1/709; H04B 1/7093
USPC .......... 342/202–204; 708/422, 425, 813, 818
See application file for complete search history.

(56) References Cited

U.S. PATENT DOCUMENTS

| | | | | |
|---|---|---|---|---|
| 3,955,197 A * | 5/1976 | Gutleber | ............... | G01S 13/288 342/378 |
| 4,164,628 A * | 8/1979 | Ward | ................... | H04B 1/7093 370/342 |
| 4,224,679 A * | 9/1980 | Nossen | ................... | G06F 17/15 708/422 |
| 4,398,274 A * | 8/1983 | Chotiros | ................. | G01S 7/526 342/189 |
| 4,513,288 A * | 4/1985 | Weathers | ............... | G01S 13/288 342/189 |
| 5,016,255 A * | 5/1991 | Dixon | ................... | H04B 1/709 375/151 |
| 5,022,047 A * | 6/1991 | Dixon | ................... | H04B 1/709 375/142 |
| 5,686,921 A | 11/1997 | Okada et al. | | |
| 5,757,309 A * | 5/1998 | Brooks | ................... | G01S 7/411 342/135 |
| 5,990,823 A * | 11/1999 | Peele | ...................... | G01S 13/26 342/192 |
| 6,028,887 A * | 2/2000 | Harrison | ................. | G06F 17/15 342/357.44 |
| 6,067,040 A | 5/2000 | Puglia | | |
| 6,087,979 A * | 7/2000 | Magori | ................... | G01S 13/34 342/118 |
| 6,577,691 B2 | 6/2003 | Richards et al. | | |
| 6,779,009 B1 * | 8/2004 | Zuber | ..................... | G06F 17/15 708/422 |
| 7,525,364 B2 | 4/2009 | Ariyoshi et al. | | |
| 7,545,188 B1 | 6/2009 | Xu et al. | | |
| 7,579,889 B2 | 8/2009 | Yang et al. | | |
| 8,406,270 B2 | 3/2013 | Brunner | | |
| 9,285,461 B2 | 3/2016 | Swirhun et al. | | |
| 2003/0179131 A1 | 9/2003 | Brosche | | |
| 2004/0263382 A1 | 12/2004 | Gottwald | | |
| 2014/0010336 A1 | 1/2014 | Suzuki | | |

FOREIGN PATENT DOCUMENTS

| | | |
|---|---|---|
| DE | 19963005 | 6/2001 |
| DE | 19963005 A1 | 6/2001 |
| JP | 07-55939 | 3/1995 |
| JP | 2006-226847 | 8/2006 |
| JP | 2007-259150 | 10/2007 |
| JP | 2013-115700 | 6/2013 |
| WO | WO 2012/131920 | 10/2012 |
| WO | WO 2012/163403 A1 | 12/2012 |

* cited by examiner

TRANSMITTER-RECEIVER SYSTEM

CROSS REFERENCE TO RELATED APPLICATIONS

This application is the National Stage Entry under 35 U.S.C. § 371 of Patent Cooperation Treaty Application No. PCT/EP2015/054678, filed Mar. 5, 2015, which claims the benefit of European Patent Application No. 14445004.6, filed Mar. 6, 2014, the contents of which are hereby incorporated by reference herein.

TECHNICAL FIELD

The present inventive concept relates to a transmitter-receiver system.

BACKGROUND

Radar has historically been used for determining the location of and to track objects such as aircrafts or vehicles over relatively great distances. Although this field of use for radar technology still is important new short range applications requiring high precision and low power consumption are now also emerging for the industrial, the medical, the security and the consumer market. Examples of applications include not only determining distances to and positions of nearby objects, but also investigation of material properties such as thickness, size, dielectric properties, material composition etc.

Although radar technology as such is a mature technical field the emerging applications introduces new challenges and requirements for the design of radar systems.

In a typical radar implementation an electromagnetic signal is transmitted and reflected by an object. The reflected signal is received and analyzed. Available technologies include for example pulse-based, Doppler or frequency modulated radars.

Pulse-based radar systems measure the time-of-flight between the transmitter and the receiver for a measurement wavelet. For example, a reflected wavelet may be mixed with a locally generated reference wavelet which is delayed by a known time with respect to the transmitted wavelet. The delay for which the maximum mixing product is achieved corresponds to the time of flight. Due to the pulsed nature of the measurement signals, this type of radar system lends itself for applications where low power consumption is a desirable. However, in order to provide high precision measurements, the delay between the reflected wavelet and the reference wavelet needs to be precisely controlled.

SUMMARY OF THE INVENTIVE CONCEPT

In view of the above, a general object of the present inventive concept is to provide a transmitter-receiver system enabling accurate control of a delay between transmission of a wavelet and generation of a reference wavelet.

According to an aspect of the inventive concept there is provided a transmitter-receiver system comprising: a transmitter arranged to transmit a wavelet; a receiver arranged to receive a wavelet; a wavelet generator arranged to generate a reference wavelet; and timing circuitry arranged to receive a reference clock signal, output a first trigger signal for triggering transmission of a wavelet and output a second trigger signal for triggering generation of a reference wavelet. The timing circuitry further comprises a delay line including at least one delay element and being arranged to receive a signal at an input of the delay line and transmit a delayed signal at an output of the delay line, wherein a state of each delay element of at least a subset of said at least one delay elements is switchable between at least a first state and a second state. A delay element in said first state, i.e. switched to its first state, presents a first propagation delay. A delay element in said second state, i.e. switched to its second state, presents a second propagation delay which differs from the first propagation delay by a value which is smaller than a period of the reference clock signal. Thereby a total propagation delay of the delay line is configurable by controlling the state of each delay element of said subset. The system further comprises a controller arranged to control a delay between the first trigger signal and the second trigger signal by controlling the total propagation delay of the delay line. The system is arranged to correlate the reference wavelet with a received wavelet for at least one setting of the total propagation delay.

By the subset of switchable delay elements the total propagation delay of the delay line may be digitally controlled without varying the number of active delay elements in the delay line. Rather the total propagation delay of the delay line may be adjusted, in a step-wise manner, by the controller controlling the states of the switchable delay element(s). The delay line and the controller hence enables the total propagation delay to be varied between a minimum value of the total propagation delay of the delay line and a maximum value of the total propagation delay of the delay line in (preferably) a plurality of discrete steps of a size smaller than the period of the reference clock signal, and even more preferably in steps of a size smaller than half the period of the reference clock signal.

The system provides control of the delay between the output of the first trigger signal and the output of the second trigger signal, wherein the delay between the transmission of a wavelet and the generation of a reference wavelet may be controlled. The accurate and digital control of the delay line renders in turn a precise and convenient control of the correlation measurement, enabling accurate determination of for example the time of flight for a transmitted and received wavelet.

Advantageously, the delay line is arranged such that the total propagation delay of the delay line is adjustable between a plurality of different total propagation delays, ranging from a minimum total propagation delay to a maximum total propagation delay and being adjustable between the minimum and maximum propagation delay in a plurality of steps of a same size. For example, said subset of delay elements may include at least two delay elements being switchable between at least the respective first and second states. Alternatively, or additionally, said at least one delay element of said subset may be switchable between at least said first, said second and a third state, a delay element in the third state presenting a third propagation delay which differs from the first and the second propagation delay by a value which is smaller than a period of the reference clock signal.

Advantageously, the difference between the second propagation delay and the first propagation delay for each delay element of the said subset is equal to one or more units of a step size parameter, which step size parameter is the same for all delay elements of said subset. The delay line may thereby be arranged to provide a total propagation delay which may be adjusted in one or more steps of a size equal to the step size parameter. Preferably, the step size parameter is smaller than the first propagation delay of each delay element of said subset.

In accordance with the above-mentioned aspect, said subset of delay elements may include at least two delay elements arranged such that each of said at least two delay elements receives the signal, one after another, and transmits the signal after a propagation delay of the delay element.

With reference to the above-mentioned aspect "a wavelet" refers to an electro-magnetic oscillating signal having an amplitude envelope beginning at zero amplitude, increasing to a maximum amplitude, and then decreasing to zero amplitude. A wavelet may comprise one or more oscillations.

The second trigger signal may trigger generation of a reference wavelet, wherein the wavelet generator is arranged to generate the reference wavelet with an initial predetermined instantaneous phase.

The wavelet generator may include a pulsed oscillator circuitry switchable between an off-state and an on-state. The pulsed oscillator circuitry may be arranged to switch from the off-state to the on-state in response to the second trigger signal, wherein generation of a reference wavelet is initiated. The pulsed oscillator circuitry may be arranged to switch back to the off-state after a predetermined duration (i.e. relative to the switching to the on-state), the predetermined duration defining the duration of the generated reference wavelet. The oscillator circuitry may include a tank circuit. The "on-state" may be defined as the state wherein the tank circuit oscillates, i.e. is active. The "off-state" may be defined as the state wherein the tank circuit does not oscillate, i.e. is inactive. A pulsed oscillator circuitry provides the advantage that the initial instantaneous phase of the reference wavelet always may be defined with a high accuracy, regardless of the delay. This may be contrasted with systems employing a pulse modulated continuous wave carrier (e.g. mixing a base-band pulse with an output of a continuously running carrier wave source) wherein different delays of the base-band pulse may result in different phase relationships between the base-band pulse and the carrier. Hence, in such systems the delay may not be arbitrarily varied without altering the initial instantaneous phase of the reference pulse. The accuracy of such systems may thus be sensitive to phase noise of the carrier wave source since the initial instantaneous phase of the reference wavelet is uncorrelated with the timing of the base-band pulse. Advantageously, also the wavelets transmitted by the transmitter may be generated by a wavelet generator arranged to generate a wavelet to be transmitted with an initial predetermined instantaneous phase in response to the first trigger signal. A transmit wavelet generator may be configured in a manner corresponding to the above-mentioned reference wavelet generator. Especially, the same wavelet generator may be used to generate both transmit wavelets and reference wavelets.

According to one embodiment the system is arranged to correlate the reference wavelet with a received wavelet for at least one setting of the total propagation delay in a measurement mode of the system.

In the measurement mode, the system may be arranged to correlate a reference wavelet with a received wavelet for a plurality of different settings of the total propagation delay of the delay line. This enables probing or scanning for an object for a plurality of different total propagation delays of the delay line and thus for a plurality of different time of flight values. This may be advantageous in applications wherein a distance to a monitored object not is known a priori. It may also be advantageous for improving the accuracy of a time of flight determination since correlation results for a plurality of different total propagation delays may be compared.

According to one embodiment each delay element comprises a logic circuit element. If the delay line comprises more than one delay element the logic circuit elements of the delay elements may be interconnected. Logic circuit elements may provide a power and cost-effective implementation of a delay line.

According to one embodiment each delay element comprises a logic circuit element, wherein each delay element of said subset is switchable between at least the first state and the second state by varying a capacitive load of the logic circuit element. The variable capacitive load may be connected to an output of the logic circuit element. The variable capacitive load of a delay element may be varied between a first capacitance, wherein said delay element presents the first propagation delay, and a second capacitance, wherein said delay element presents the second propagation delay. This provides a comparably simple implementation of a switchable delay element.

According to one embodiment each delay element comprises a logic circuit element, wherein each delay element of said subset is switchable between at least a first state and a second state by varying a current supplied to the logic circuit element. A delay element may be switchable between said at least first and second state by varying a charge/discharge current of the logic circuit element. The current may be varied between a first current, wherein said delay element presents the first propagation delay, and a second current, wherein said delay element presents the second propagation delay. This provides a comparably simple implementation of a switchable delay element. In particular, the logic circuit element may be switchable between a first current limited state and a second current limited state.

According to one embodiment an adjustment range of the total propagation delay of the delay line corresponds to at least a period of the reference clock signal or a half period of the reference clock signal. The total propagation delay of the delay line may hence be adjusted in a step-wise manner throughout at least a half or whole period of the reference clock signal. This may improve the flexibility of the system.

According to one embodiment the timing circuitry further comprises trigger circuitry arranged to receive, at an input of the trigger circuitry, a clock signal and transmit, at an output of the trigger circuit, the second trigger signal in response to receiving a number of rising and/or falling edges of the clock signal, wherein the controller is arranged to control a delay between the output of the first trigger signal and the second trigger signal by controlling the total propagation delay of the delay line and said number of rising and/or falling edges. The trigger circuitry may thus be arranged to delay an output of the second trigger signal with respect to an output of the first trigger signal by a number of periods (or half periods) of the clock signal. The second trigger signal may be transmitted to the output of the timing circuitry. According to these embodiments, the delay between the transmitted wavelet and the generation of the reference wavelet may be controlled using two different mechanisms: by controlling the total propagation delay of the delay line (what may be referred to as a fine delay control), and by controlling the trigger event of the trigger circuitry (what may be referred to as a coarse delay control). Additionally, the dynamic range of the system may be improved. Greater changes of the delay between the transmitted wavelet and the reference wavelet (i.e. changes which exceed the step size of the coarse delay control) may be achieved by the coarse delay control (i.e. by controlling the number of rising and/or falling edges) in combination with the fine delay control. Meanwhile, smaller changes of the delay (i.e. changes which fall below the step size of the coarse delay control) may be achieved by the fine delay control.

According to one embodiment the clock signal received by the trigger circuitry is a delayed reference clock signal transmitted by the delay line. The delay line may be arranged to receive, at the input of the delay line, the reference clock signal from an input of the timing circuitry and transmit, at the output of the delay line, a delayed reference clock signal to the input of the trigger circuitry. Thus the fine delay control may be applied prior to the coarse delay control.

According to one embodiment the system is arranged to, for at least one setting (preferably at least two settings) of said number of rising and/or falling edges for the trigger circuitry, correlate a reference wavelet with a received wavelet for a set of different total propagation delays of the delay line. Thereby correlation results for a set of different delays between a transmitted wavelet and a reference wavelet may be determined, which set may span over an interval greater than one or more reference clock signal periods or half reference clock signal periods. The correlation results may be obtained for delay values which differ by the step size of the fine delay control. The correlations may be performed in a measurement mode of the system.

The first propagation delay (of the first state) may be smaller than the second propagation delay (of the second state) for each delay element of the subset of delay elements. Thus, a propagation delay of a switchable delay element may be increased by switching from the first to the second state. In particular, the second state of each delay element of the subset may be the state (of each delay element) resulting in the greatest propagation delay of said at least first and second states (of each delay element). At least one delay elements of the subset of switchable delay elements may further be switchable between more than two states, wherein the second state for each delay element switchable between more than two states is the state resulting in the greatest propagation delay for said delay element.

According to one embodiment the delay line includes at least one tunable delay element having a propagation delay which is tunable, wherein the controller is arranged to control or set each delay element of said subset of delay elements to said first state and thereafter tune the propagation delay of said at least one tunable delay element such that the total propagation delay of the delay line corresponds to an integer number of periods of the reference clock signal or half periods of the reference clock signal. Thereby a first end point of the adjustment range of the total propagation delay of the delay line may be tuned to correspond to an integer number of half periods of the reference clock signal.

Said at least one tunable delay element may be formed by the delay elements of the subset of switchable delay elements. Accordingly, according to one embodiment the controller is arranged to control or set each delay element of said subset of delay elements to said first state and thereafter tune the first propagation delay of each delay element of said subset of delay elements such that the total propagation delay of the delay line corresponds to an integer number of periods of the reference clock signal or half periods of the reference clock signal. Thereby a first end point of the adjustment range of the total propagation delay of the delay line may be tuned to correspond to an integer number of half periods of the reference clock signal. The first end point may then be used as a reliable reference from which the total propagation delay of the delay line may be adjusted by changing the states of the delay elements. If used in combination with the trigger circuitry, in accordance with any of the above embodiments, the first end point may serve as a reliable reference for any setting of the number of rising and/or falling edges for the trigger circuitry.

Alternatively, said at least one tunable delay element may be formed by an additional delay element, not forming part of the subset of switchable delay elements. Accordingly, according to an alternative embodiment the delay line includes an additional delay element having a propagation delay which is tunable, wherein the controller is arranged to control or set each delay element of said subset of delay elements to said first state and thereafter tune the propagation delay of said additional delay element such that the total propagation delay of the delay line corresponds to an integer number of periods of the reference clock signal or half periods of the reference clock signal. This embodiment provides advantages corresponding to the embodiment for tuning the first propagation delay. Additionally, tuning the additional delay element, compared to tuning each delay element of said subset of delay elements, may simplify the implementation of the controller and/or the delay line.

According to one embodiment the controller is further arranged to control or set each delay element of said subset of delay elements to said second state and tune the second propagation delay of each delay element of said subset of delay elements such that the total propagation delay of the delay line corresponds to an integer number of periods of the reference clock signal or half periods of the reference clock signal.

This embodiment may be combined with any of the above-mentioned embodiments tuning the first end point of the adjustment range of the total propagation delay, e.g. either the embodiment for tuning the first propagation delay or the embodiment for tuning the propagation delay of the additional delay element. According to the embodiment a second end point of the adjustment range of the total propagation delay of the delay line may be tuned to correspond to an integer number of half periods of the reference clock signal. The second end point may then be used as a reliable reference from which the total propagation delay of the delay line may be adjusted by changing the states of the delay elements. If used in combination with the trigger circuitry, in accordance with any of the above embodiments, the second end point may serve as a reliable reference for any setting of the number of rising and/or falling edges for the trigger circuitry. In particular, tuning of the second propagation delay of a delay element may comprise tuning the size of the step size parameter defined above.

According to an embodiment combining the embodiment for tuning the first propagation delay and the embodiment for tuning the second propagation delay, the controller of the system is arranged to:

control or set each delay element of said subset of delay elements to said first state and thereafter tune the first propagation delay of each delay element of said subset of delay elements such that the total propagation delay of the delay line corresponds to a first integer number of periods of the reference clock signal or half periods of the reference clock signal, and control or set each delay element of said subset of delay elements to said second state and thereafter tune the second propagation delay of each delay element of said subset of delay elements such that the total propagation delay of the delay line corresponds to a second integer number of periods of the reference clock signal or half periods of the reference clock signal.

This embodiment provides similar advantages as the above mentioned embodiments for tuning the first and the second propagation delay or the propagation delay of the additional delay element.

Also an embodiment combining tuning of the first and the second propagation delay may be particularly advantageous for a system comprising the trigger circuitry in accordance with any of the above embodiments. Since the first end point of the adjustment range of the delay line corresponds to a first integer number of (half) reference clock signal periods and the second end point corresponds to a second integer number of (half) reference clock signal periods, a linear control of the delay between the first trigger signal for triggering transmission of a wavelet and the second trigger signal for triggering generation of a reference wavelet is possible. If the first propagation delay is smaller than the second propagation delay for each switchable delay element the first end point of the adjustment range of the delay line may correspond to a minimum end point of the adjustment range, i.e. a minimum value of the total propagation delay of the delay line. Further, if the second state of each delay element of the subset is the state resulting in the greatest propagation delay of the at least first and second states of each delay element the second end point of the adjustment range of the delay line may correspond to a maximum end point of the adjustment range, i.e. a maximum value of the total propagation delay of the delay line. Assuming, as an example, that the second integer is equal to the first integer plus one a same delay between the first and the second trigger signal output by the trigger circuitry may be obtained by either setting the number of rising and/or falling edges for the trigger circuitry to X and setting all switchable delay elements to their respective second state, or by setting the number of rising and/or falling edges for the trigger circuitry to X+1 and setting all switchable delay elements to their respective first state. Thus the linearity of the control of the delay between the first trigger signal and the second trigger signal may be improved. An associated advantage is that overlaps or gaps in correlation measurements for a range of delays, which range exceeds one (half) period of the reference clock signal, may be avoided since the adjustment range for the fine delay control (i.e. the total propagation delay of the delay line) may be tuned to correspond to precisely one (half) period of the reference clock signal. Consequently, an accurate estimate of the step size of the total propagation delay of the delay line may be obtained by dividing the length of a (half) reference clock signal period by the number of steps in which the total propagation delay of the delay line may be adjusted.

The controller may be arranged to perform the acts in any of the above embodiments including tuning of the first propagation delay, the second propagation delay or both, or the propagation delay of the additional delay element in a calibration mode of the system.

According to one embodiment the controller is further arranged to determine a phase difference between the reference clock signal, received at the input of the delay line, and a delayed reference clock signal, output from the delay line, and tune the first propagation delay and/or the second propagation delay of each delay element of said subset of delay elements based on the phase difference. In an embodiment wherein the delay line includes an additional delay element having a propagation delay which is tunable the controller may also be arranged to tune the propagation delay of the additional delay element based on the phase difference. The controller may tune the respective propagation delay until the determined phase difference differs from zero by less than a threshold (if tuning for correspondence with entire reference clock signal periods), or until the determined phase difference differs from 180 degrees by less than a threshold (if tuning for correspondence with half periods of the reference clock signal). These embodiments may be applied to any of the above embodiments including tuning of the first propagation delay, the second propagation delay or both. Detecting a phase difference provides an accurate way of determining when the total propagation delay of the delay line sufficiently corresponds to a number of (half) periods of the reference clock signal.

According to one embodiment the controller is arranged to tune the first and/or the second propagation delay of each delay element of said subset of delay elements using a control signal which is common for the delay elements of said subset. Thereby a same tuning of all switchable delay elements may be achieved during tuning. This may simplify the implementation of the controller and/or the delay line. Additionally it may facilitate an equal tuning for all switchable delay elements.

According to one embodiment each delay element comprises a logic circuit element, wherein each delay element of said subset is switchable between at least the first state and the second state by varying a capacitive load of the logic circuit element between a first capacitance and a second capacitance, and wherein the tuning of the first propagation delay comprises tuning the first capacitance and the tuning of the second propagation delay comprises tuning the second capacitance. This provides a comparably simple and accurate implementation of the delay line and the calibration.

According to one embodiment each delay element comprises a logic circuit element, wherein each delay element of said subset is switchable between at least a first state and a second state by varying a current supplied to the logic circuit element between a first current and a second current, and wherein the tuning of the first propagation delay comprises tuning the first current and the tuning of the second propagation delay comprises tuning the second current. This provides a comparably simple and accurate implementation of the delay line and the calibration.

In the above-mentioned embodiment wherein the delay line includes an additional delay element having a propagation delay which is tunable, the additional delay element may comprise a logic circuit element wherein tuning the propagation delay of the additional delay element may comprise tuning a capacitive load of the logic circuit element or a current supplied to the logic circuit element.

According to one embodiment the controller is arranged to determine a first setting of the states of the delay elements of said subset of delay elements, resulting in a total propagation delay of the delay line corresponding to a first integer number of periods of the reference clock signal or half periods of the reference clock signal. Thereby, a first setting of the states resulting in a total propagation delay corresponding to a (first) integer number of (half) periods of the reference clock signal may be determined. The first setting may then be used as a reliable reference from which the total propagation delay of the delay line may be adjusted, i.e. by changing the setting of one or more of the delay elements. The controller may be arranged to determine the first setting by controlling or setting a number of the delay elements of said subset of delay elements to their respective first state and thereafter repeatedly change the state of one or more of the delay elements of the subset until the total propagation delay of the delay line corresponds to a first integer number of (half) reference clock signal periods.

In addition to a first setting of the states of the delay elements of the subset the controller may be arranged to determine a second setting of the states of the delay elements of said subset of delay elements, resulting in a total propagation delay of the delay line corresponding to a second integer number of periods of the reference clock signal or half periods of the reference clock signal. The controller may be arranged to determine the second setting by setting or controlling the states of the delay elements of the subset in accordance with the determined first setting and thereafter repeatedly changing the state of one or more of the delay elements of the subset until the total propagation delay of the delay line corresponds to the second integer number of (half) reference clock signal periods. The first and the second settings may then be used as settings defining end points of the adjustment range of the total propagation delay.

The first setting of the states may result in a total propagation delay which is smaller than a total propagation delay resulting from the second setting of the states.

The first propagation delay may be smaller than the second propagation delay for each switchable delay element wherein the first setting may be determined by setting or controlling each delay element of the subset to the respective first state and thereafter repeatedly change the state of one or more of the delay elements to increase the total propagation delay until the total propagation delay of the delay line corresponds to the first integer number of (half) reference clock signal periods. Further, the second setting may be determined by setting or controlling each delay element of the subset in accordance with the determined first setting and thereafter repeatedly change the state of one or more of the delay elements to increase the total propagation delay until the total propagation delay of the delay line corresponds to the second integer number of (half) reference clock signal periods.

Also this embodiment may be particularly advantageous for a system comprising trigger circuitry, in accordance with any of the above embodiments. Since the first setting of the states results in a total propagation delay corresponding to a first integer number of (half) reference clock signal periods and the second setting results in a total propagation delay corresponding to a second integer number of (half) reference clock signal periods, a linear control of the delay between the first trigger signal for triggering transmission of a wavelet and the second trigger signal for triggering generation of a reference wavelet is possible. Assuming, as an example, that the second integer is equal to the first integer plus one a same delay between the first and the second trigger signal output by the trigger circuitry may be obtained by either setting the number of rising and/or falling edges for the trigger circuitry to X and setting the switchable delay elements in accordance with the determined second setting, or by setting the number of rising and/or falling edges for the trigger circuitry to X+1 and setting the switchable delay elements in accordance with the determined first setting. Thus the linearity of the control of the delay between the first trigger signal and the second trigger signal may be improved. An associated advantage is that overlaps or gaps in correlation measurements for a range of delays exceeding one (half) period of the reference clock signal may be avoided since the adjustment range for the fine delay control (i.e. the total propagation delay of the delay line) may be determined to correspond to precisely one (half) period of the reference clock signal. Consequently, an estimate of the step size of the total propagation delay of the delay line may be obtained by dividing the length of a (half) reference clock signal period by the number of steps in which the total propagation delay of the delay line may be adjusted between the first and the second setting. A maximum error of this estimate will correspond to the step size of the total propagation delay.

According to one embodiment the controller is further arranged to determine a phase difference between the reference clock signal, received at the input of the delay line, and a delayed reference clock signal, output from the delay line, and determine said first and/or second settings by repeatedly changing the state of one or more of the delay elements of said subset of delay element based on the determined phase difference. The controller may change the state of one or more of the delay elements of said subset until the determined phase difference differs from zero by less than a threshold (if tuning for correspondence with entire reference clock signal periods), or until the determined phase difference differs from 180 degrees by less than a threshold (if tuning for correspondence with half periods of the reference clock signal). This embodiment may be applied to any of the above embodiments including determination of the first or second settings or both. Determining a phase difference provides an accurate way of determining when the total propagation delay of the delay line sufficiently corresponds to a number of (half) periods of the reference clock signal.

According to an alternative embodiment the system may be arranged to, during a measurement mode of the system, for each correlation between a reference wavelet and a received wavelet, determine and record a phase difference between the reference clock signal received at the input of the delay line and a delayed reference clock signal transmitted at the output of the delay line. This makes it possible to determine the above-mentioned first and the second settings of the states of the delay elements of said subset during post-processing, i.e. by finding the settings of the states of the delay elements of the delay line which result in a desired phase difference (e.g. approximately zero degrees or approximately 180 degrees). Consequently, the delay between a transmitted wavelet and generation of a reference wavelet resulting from each setting of the delay line, as well as the step size, may be estimated during post-processing.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein.

DETAILED DESCRIPTION OF PREFERRED EMBODIMENTS

Detailed embodiments of aspects of the present inventive concept will now be described with reference to the drawings.

Figure 1:
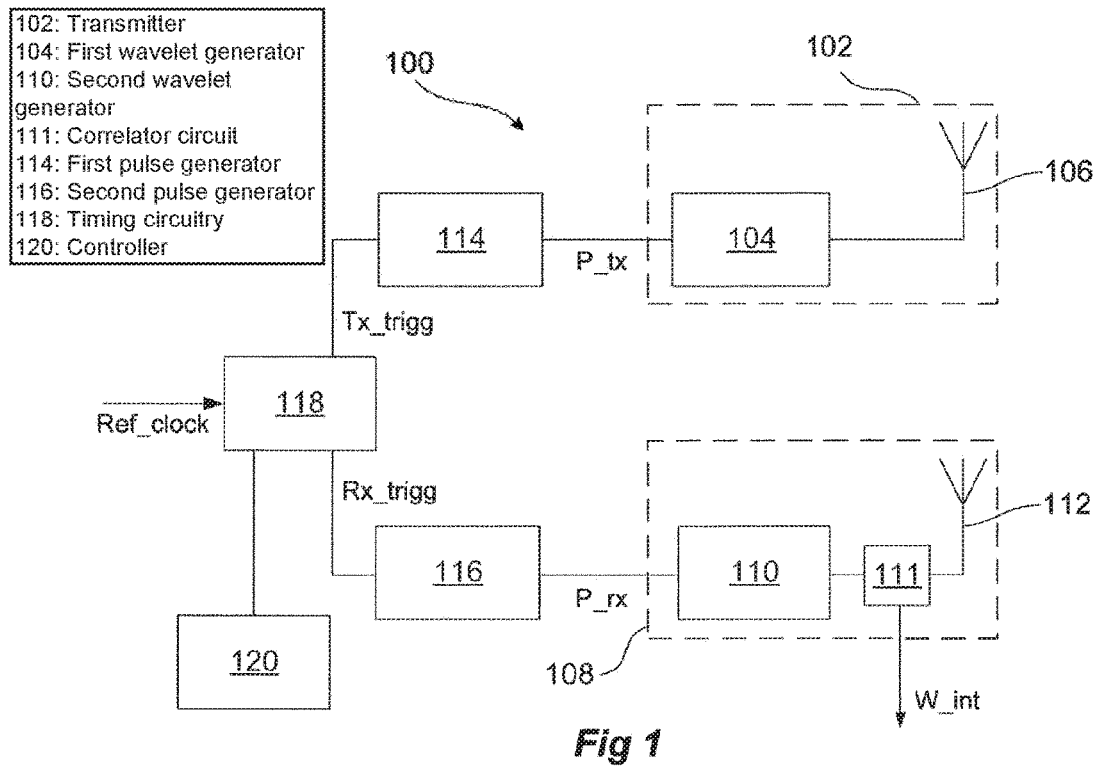
FIG. 1 is a schematic illustration of a general layout of a transmitter-receiver system in accordance with an embodiment.

FIG. 1 generally illustrates a layout of a transmitter-receiver system 100 in accordance with an embodiment. For brevity, the transmitter-receiver system will in the following be referred to as the system 100. The system 100 comprises a transmitter 102 and a receiver 108. The transmitter 102 includes a first wavelet generator 104. The transmitter 102 is arranged to transmit wavelets generated by the first wavelet generator 104. As will be described in greater detail below the first wavelet generator 104 may be arranged to generate a wavelet in response to a trigger signal P_tx. The receiver 108 is arranged to receive wavelets originally transmitted by the transmitter 102 and reflected by an external object, the type of object being dependent on the particular application of the system 100. The receiver 108 includes a second wavelet generator 110. As will be described in greater detail below the second wavelet generator 110 may be arranged to generate a wavelet in response to a trigger signal P_rx. Wavelets generated by the second wavelet generator 110 may in the following be referred to as reference wavelets.

The receiver 108 further comprises a correlator circuit 111 arranged to correlate a reference wavelet with a wavelet received by the receiver 108, if any. More generally, the correlator circuit 111 may be arranged to correlate a reference wavelet received at a first input of the correlator circuit 111 with a signal received at a second input of the correlator circuit 111. The signal may or not may not include a received wavelet depending on the timing of the reference wavelet. The result of the correlation may be provided at an output of the receiver 108. According to a preferred embodiment, the correlator circuit 111 includes a mixer for mixing a reference wavelet with a received wavelet. The product W_mix may be provided to an integrator (not shown in FIG. 1) which may form part with the receiver 108 or be arranged external to the receiver 108. The integrated product W_int may be provided to an analog-to-digital converter (ADC) and a digital signal processor (DSP) for further processing and analysis. Moreover, the integrated product W_int may also be amplified or attenuated before being provided to an ADC in order to optimize the signal level with respect to the dynamic range of the ADC. The amplification or attenuation may be variable to accommodate different signal levels to the ADC dynamic range.

As schematically indicated in FIG. 1 the transmitter 102 may include a transmitting antenna 106 wherein the transmitter 102 may be arranged to transmit wavelets via the transmitting antenna 106. Similarly, the receiver 108 may include a receiving antenna 112 wherein the receiver 108 may be arranged to receive wavelets via the receiving antenna 112. In that case, an input of the correlator circuit 111 may be connected to an output of the receiving antenna 112. The transmitting antenna 106 and a receiving antenna 112 may provide improved range for the system 100 as well as an improved directional control. Although illustrated as physically separate antennas, the system 100 may alternatively use a same antenna for transmitting and receiving wavelets. If needed, additional amplifiers (not shown) may be provided in connection to both the transmitter and receiver antennas. The antenna(s) may be provided in an integrated antenna implementation such as a patch antenna configuration. Further non-limiting examples include a slot configuration, a ring configuration, a spiral configuration, a bow-tie configuration, a Vivaldi configuration, and a quasi-yagi configuration.

The system 100 further comprises timing circuitry, as generally indicated by reference numeral 118 in FIG. 1. The timing circuitry 118 is arranged to receive a reference clock signal Ref_clock at an input of the timing circuitry 118 and output a first trigger signal Tx_trigg and a second trigger signal Rx_trigg, wherein the outputs of the signals Tx_trigg and Rx_trigg are delayed with respect to each other. Various forms of Tx_trigg and Rx_trigg are possible. For example, the timing circuitry 118 may be arranged to output Tx_trigg by increasing or decreasing a voltage level at the Tx_trigg output of the timing circuitry 118. Similarly the timing circuitry 118 may be arranged to output Rx_trigg by increasing or decreasing a voltage level at the Rx_trigg output of the timing circuitry 118. Each of Tx_trigg and Rx_trigg may thus comprise a rising or a falling edge. Alternatively, each of the first trigger signal Tx_trigg and the second trigger signal Rx_trigg may comprise one or more rising and/or falling edges. Each of Tx_trigg and Rx_trigg may for example include a pulse or a train of pulses.

The reference clock signal Ref_clock may be a periodic signal oscillating between a high and a low level or state (e.g. a first voltage level and a second voltage level). The Ref_clock may be provided by a reference clock comprised in the system 100 or arranged external from the system 100. The duration of a period of the Ref_clock signal will in the following be denoted T_ref. Ref_clock forms a control signal for the system 100 providing a time basis for the system. The frequency of the reference clock signal will depend on the application of the system 100. As a non-limiting example the reference clock signal may have a frequency in the 10 MHz to 10 GHz range.

Optionally, the timing circuitry 118 may be preceded by a frequency multiplier or up-converter (not shown) arranged to receive a clock signal at a base frequency and output a clock signal having a frequency which is a multiple of the base frequency. A frequency multiplier may for example be implemented using a phase-locked loop (PLL) arranged to receive and lock on to the phase of the received clock signal and up-convert the received clock signal by a factor P, e.g. an optionally configurable fraction or integer number. Thereby a higher frequency reference signal may be used to control the relative timing of generation of transmission wavelets and reference wavelets while avoiding high frequency clock signals in other (not shown) parts connected to the system 100. In the following, the reference clock signal Ref_clock received by the timing circuitry may thus be a reference clock signal of the base frequency or an up-converted frequency.

The system 100 further comprises a first pulse generator 114. The first pulse generator 114 is arranged to receive the first trigger signal Tx_trigg from the timing circuitry 118. The pulse generator 114 is further arranged to output a pulsed signal P_tx in response to receiving the first trigger signal Tx_trigg. Tx_trigg may thus trigger the output of the first pulse generator 114. More specifically, P_tx may be a baseband pulse. P_tx may have a duration of Ptx_dur. The pulse generator 114 may comprise a combination of digital gates, such as INV, NOR, and NAND, where the configuration of the gates enables that a rising or falling edge received at the input of the first pulse generator 114 triggers the generation of a pulse on the pulse generator output. As an example, the input signal may be fed to a first input of a NOR gate and to an input of an INV gate. The output of the INV gate may be connected to a second input of the NOR gate. By this configuration a pulse P_tx may be triggered each falling edge of the input signal, where the duration of the pulse corresponds to the propagation delay of the INV gate. However, as this is one example of the pulse generator implementation there are other methods that provide the same functionality using digital gates, transistors, diodes and passive devices.

The first wavelet generator 104 is arranged to output a wavelet in response to the signal P_tx. More specifically, the first wavelet generator 104 may be arranged to generate and output a wavelet in response to receiving P_tx. Advantageously the first wavelet generator 104 may be arranged to generate a wavelet with a duration equal to P_tx_dur.

The system 100 further comprises a second pulse generator 116. The second pulse generator 116 is arranged to receive the second trigger signal Rx_trigg from the timing circuitry 118. The pulse generator 116 is further arranged to output a pulsed signal P_rx in response to receiving the second trigger signal Rx_trigg. Rx_trigg may thus trigger the output of the second pulse generator 116. More specifically, P_rx may be a baseband pulse. P_rx may have a duration of P_rx_dur. P_rx_dur may be equal to T_rx_dur.

Referring to FIG. 1, the second wavelet generator 110 is arranged to output a wavelet, forming a reference wavelet, in response to the pulsed signal P_rx. More specifically, the second wavelet generator 110 may be arranged to generate and output a wavelet in response to receiving P_rx. Advantageously the duration of the wavelet output by the second wavelet generator 110 corresponds to P_rx_dur.

If Tx_trigg and Rx_trigg include a single rising and/or rising edge, the output of Tx_trigg and Rx_trigg may result in the output of a single pulsed signal P_rx and T_rx by the first pulse generator 114 and the second pulse generator 116, respectively. If Tx_trigg and Rx_trigg include a plurality of rising and/or falling edges, the output of Tx_trigg and Rx_trigg may result in the output of a plurality of pulsed signals P_rx and T_rx by the first pulse generator 114 and the second pulse generator 116, respectively. Thus a single output of a trigger signal (Tx_trigg or Rx_trigg) may result in generation of a plurality of wavelets (transmit wavelets by the first wavelet generator 114 or reference wavelets by the second wavelet generator 110).

Although in FIG. 1 the first pulse generator 114 has been illustrated as being a separate component from the first wavelet generator 104 this distinction has been made to facilitate understanding. For example the functionality of the first pulse generator 114 may be implemented in a same circuitry as the first wavelet generator 104. According to this example the system may comprise a first wavelet generator 104 arranged to output a wavelet in response to receiving the trigger signal Tx_trigger from the timing circuitry 118. Additionally, although in FIG. 1 being provided outside the transmitter 102, the first pulse generator 114 may also form part of the transmitter 102. This discussion applies correspondingly to the second pulse generator 116 and the second wavelet generator 110. Moreover, although the system 100 includes two separate wavelet generators, the present inventive concept is equally applicable to a system using a same wavelet generator for generation of the transmission wavelet and the reference wavelet. For example, a switch may be arranged at the output of the wavelet generator allowing a generated wavelet to be provided to the transmit antenna 106 or to the correlator circuit 111.

The first wavelet generator 104 and the second wavelet generator 110 may each include a pulsed oscillator circuitry arranged to be switched from an off-state to an on-state and back to the off-state, wherein the oscillator circuitry during the on-state generates and outputs an oscillating signal for forming a transmit wavelet or a reference wavelet with an initial predetermined instantaneous phase. The initial instantaneous phase (i.e. the instantaneous phase at start-up of the oscillation of the generated wavelet) may be the same for each of the transmit wavelets and/or the reference wavelet(s) (for example an instantaneous phase of 0°). However variation of the initial instantaneous phase has also been contemplated (for example generating a first set of one or more transmit or reference wavelets with an initial instantaneous phase of 0° and a subsequent set of one or more transmit or reference wavelets with an initial instantaneous phase of 180°). According to a preferred example, the first wavelet generator 104 and second wavelet generator 110 may be implemented using a transceiver module as described in PCT/EP2011/058847 in transmitter operation. The transceiver module comprises: a tank circuit, a variable differential conductance (VDC), preferably in the form of a resonant tunneling diode (RTD), coupled to the tank circuit, and a variable resistance coupled to the VDC and arranged to bias the VDC into a region of positive differential conductance during a first state of operation of the transceiver, and bias the VDC into a region of negative differential conductance during a second state of operation of the transceiver. During the transceivers first state of operation no output signal is generated and during the second state of operation a sinusoidal radio frequency signal is generated. Thus by switching the transceiver from the first state to the second state and back to first state again, a wavelet signal may be generated where the duration of the wavelet corresponds to the time the transceiver is in its second state of operation. The transceiver may switch to the second state in response to receiving the pulsed signal (i.e. P_tx or P_rx) and maintain the second state for the duration of the pulsed signal. Compared with other methods of wavelet generation, this implementation offers a low-complexity method for generating wavelets with a well-defined start position and duration and a coherent phase content within the wavelet which enables phase dependent system implementation such as the system 100 and low power consumption due to the pulsed operation. This particular implementation may enable generation of wavelets of a duration between 10 ns and 10 ps in the mm-wave band, which gives a theoretical range resolution of 1.5 m to 1.5 mm, respectively. The wavelet generator described above may be implemented by using other oscillator configurations, for example, relying on negative differential conductance or positive feedback, where it is possible to start and quench the oscillations rapidly. Alternative implementations of wavelet generators include passing a continuous oscillation through a switchable amplifier, filtering of a baseband pulse, up-conversion of a baseband pulse, or using digital gates to create the desired waveform.

With reference to FIG. 1, the system 100 comprises a controller 120. The controller 120 is arranged to control a delay between, on the one hand, a rising or falling edge of Ref_clock and the output of the trigger signal Tx_trigg, and on the other hand, a delay between said rising or falling edge of Ref_clock and the output of the trigger signal Rx_trigg. Thereby, the controller 120 may control a relative delay between Tx_trigg and Rx_trigg as will be described in greater detail below. By controlling the delay between the trigger signals Tx_trigg and Rx_trigg, the controller 120 may control a delay between transmission of a wavelet and generation of a reference wavelet.

Figure 2:
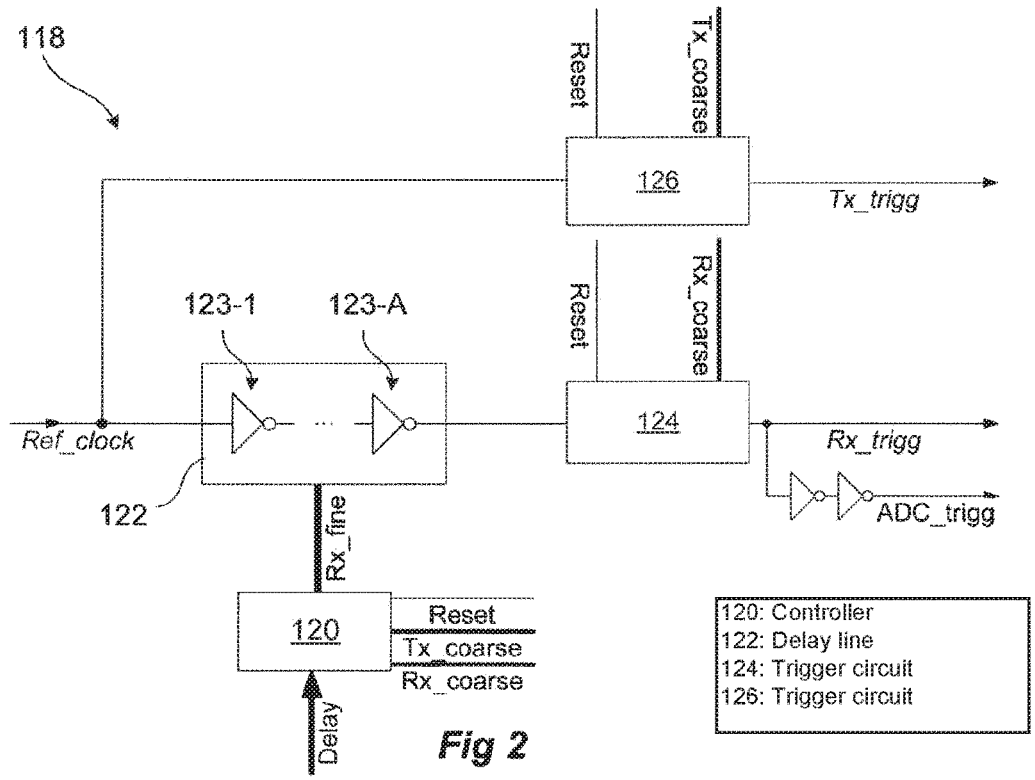
FIG. 2 schematically illustrates an embodiment of the timing circuitry in FIG. 1.

FIG. 2 schematically illustrates an embodiment of the timing circuitry 118. The timing circuitry 118 comprises a delay circuit 122 and trigger circuitry which will be disclosed in greater detail below. The delay circuit 122 includes delay elements 123-1 to 123-A which will be commonly referenced 123. The delay elements 123 of the delay line 122 are arranged in a sequence to form a delay line. In the following, the delay circuit 122 may thus be referred to as a delay line 122. The number of delay elements 123, denoted A, may vary for different implementations as may be understood from the following.

In FIG. 2, each delay element 123 is illustrated as including a logic circuit element in the form of an inverter. Inverters may enable a reliable and power efficient implementation of a delay line. However other types of logic circuit elements are also possible, such as AND-gates and OR-gates. More generally any circuit element may be used which is arranged to receive a signal at an input and transmit the received signal at an output after a certain time, i.e. the propagation delay of the circuit element. The circuit element may for example receive a signal at the input and transmit a signal at an output in response to a signal level (e.g. a voltage level) of the received signal exceeding a predetermined threshold. In the context of this application, a propagation delay of a delay element or another component may be defined as the length of time between a changed signal level at the input results in a changed signal level at the output. More specifically, a propagation delay may be determined as the time passing from an instant at which a level of an input signal crosses 50% of a maximum input amplitude to a following instant at which a level of an output signal crosses 50% of a maximum output amplitude. These definitions correspond to established conventions in the art.

Returning to FIG. 2, the delay line 122 is arranged to receive the reference clock signal Ref_clock at an input of the delay line 122 and transmit a delayed reference clock signal at an output of the delay line 122. The delay element 123-1 may receive Ref_clock from the input of the delay line 122. Each delay element 123-2 to 123-A may then, one after another, receive a (partially) delayed representation of Ref_clock from a previous delay element 123-1 to 123-(A−1) and transmit a (partially) delayed representation of Ref_clock to a next delay element 123-2 to 123-A.

In accordance with the present inventive concept each delay element 123 is arranged to be switchable, independently from the other delay elements 123 of the delay line 122 (if any) between two states. In the following, reference will be made to the A delay elements 123 of the delay line 122. However it should be noted that the delay line 122 may include further delay elements which may, or may not, be switchable delay elements. The delay elements 123 may thus form a subset of delay elements of the delay line 122. A delay element 123-$i$ switched to a first state may present a propagation delay $\tau_i$ ($i=1 \ldots A$). A delay element 123-$i$ switched to a second state may present a propagation delay $\tau_i+\Delta t_i$. It may be understood that $\tau_i$ may vary between the delay elements, e.g. due to imperfections during manufacturing or slightly different electric environments. As may be understood from the following variations of $\tau_i$ between different delay elements need not negatively affect the usability of the delay line 122 with respect to the system 100. Additionally $\Delta t_i$ may vary slightly between the delay elements 123. The delay line 122 should preferably be designed such that any variations of $\Delta t_i$ between the delay elements 123 are minimized or at least reduced. To simplify understanding of the present inventive concept it will in the following discussion be assumed that these differences are negligible and that $\tau_i$ and $\Delta t_i$ are substantially equal for all delay elements, wherefore the index i may be omitted.

By controlling the states (i.e. switching the delay elements between their respective states), a total propagation delay of the delay line 122 may be varied in discrete steps of size $\Delta t$ (thus forming a step size for the delay line) from $A*\tau$ to $A*(\tau+\Delta t)$. Optionally, one or more of the delay elements 123 may be switchable between three states wherein a propagation delay of a delay element 123 may be switched between any one of $\tau$, $\tau+\Delta t$ or $\tau+2*\Delta t$. More generally, a delay element may be switchable between D+1 different states, where $D \geq 1$. A propagation delay for such a delay element may thereby be varied between a propagation delay of duration $\tau$ to $\tau+D*\Delta t$ in discrete steps of size $\Delta t$.

In one example, all A delay elements 123 are switchable between D+1 states wherein the total propagation delay of the delay line 122 may be changed in discrete steps of the step size $\Delta t$ from $A*\tau$ to $A*(\tau+D*\Delta t)$. However, it is not a requirement that all A delay elements are switchable between a same number of states. Neither is it a requirement that the difference between a first propagation delay of a first state, and a second propagation delay of a second state is the same for different delay elements. In one example, the delay line 122 may include one switchable delay element 123 (A=1), the delay element 123 being switchable between a plurality of states, each successive state increasing the propagation delay of the delay element 123 by the step size $\Delta t$. In one example, the delay line 122 may include two delay elements 123, a first delay element being switchable between D+1 states, the propagation delay in a states being $\tau+\Delta t*(s-1)$ (where $1 \leq s \leq D+1$), and a second delay element being switchable between two states of propagation delay $\tau$ and $\tau+\Delta t*D$, respectively. The total propagation delay of the delay line 122 may thereby be adjusted between $2*\tau$ and $2*\tau+\Delta t*2*D$ in steps of size $\Delta t$. More generally, each delay element 123 may be switchable between two or more states, wherein the difference between the propagation delays of any two of the states is equal to one or more units of the step size $\Delta t$. Moreover, the delay elements 123 in combination contribute to a total propagation delay of the delay line 122 which may be adjusted in a plurality of steps of size $\Delta t$ between a minimum total propagation delay and a maximum total propagation delay.

Generally, the system parameters A and $\tau$ are preferably determined such that $A*\tau$ corresponds to one or more periods of Ref_clock, i.e. T_ref. Alternatively as will be further described below, A and $\tau$ may be such that $A*\tau$ corresponds to one or more half periods of Ref_clock, i.e. T_ref/2. Moreover, the step size $\Delta t$ is preferably smaller than the period of the Ref_clock. Advantageously $\Delta t$ is determined such that a plurality of units of $\Delta t$ is required to correspond to the period of Ref_clock. The adjustment range of the delay line 122 preferably meets or exceeds the period time T_ref of Ref_clock.

Optionally, the delay line 122 may include an additional, non-switchable, delay element (not shown). The additional delay element may act as a buffer stage arranged at the output of the delay line 122. A buffer stage may in some cases improve the accuracy and predictability of the system 100 by providing a well-defined output capacitance for the delay line 122. The buffer stage may for example include an inverter of a same type as the delay elements 123. For corresponding reasons, a buffer stage may also be arranged at the input of the delay line 122. As may be understood, a buffer stage may contribute to the total propagation delay of the delay line 122 by a certain amount. The contribution of a buffer stage to the total propagation delay of the delay line 122 will however in general be constant regardless of the switching states of the delay elements 123 and will therefore, to simplify understanding, be disregarded in the following.

To facilitate understanding of the present inventive concept, it will in the following be assumed that the delay line 122 includes A number of delay elements 123, each being switchable between D+1 states. Referring to FIG. 2, the controller 120 is arranged to control the total propagation delay of the delay line 122 by controlling the states of the delay elements 123. The controller 120 may control the delay line 122 using a digital control signal Rx_fine output by the controller 120 and received by the delay line 122. As will be described in more detail below, the controller 120 may include an arithmetic logic unit for determining Rx_fine. Rx_fine may be arranged to indicate to the delay line 122 which states each delay element 123 should be switched to, i.e. indicate the setting of the states of the delay elements 123. A particular setting of the states of the delay elements 123 may be referred to as a configuration of the delay line 122. The delay line 122 may thus provide a digital-to-time transfer function, i.e. converting a digital value represented by the digital control signal Rx_fine to a total propagation delay of the delay line 122. The control signal Rx_fine may for example be transmitted to the delay line 122 on a serial or parallel bus. The control of the delay line 122 may be implemented in a number of different ways:

In one implementation, Rx_fine may be a digital signal comprising A number of signal portions or components, each of the A signal portions or components indicating for each of the A delay elements 123 the number of units of $\Delta t$ (i.e. 0 to D) to be added to $\tau$ of each delay element 123.

In one implementation, the delay line 122 may comprise a plurality of digital inputs, one set of inputs per delay element 123, each set comprising D number of inputs wherein a control signal component provided by the controller 120 to each input may control whether an additional propagation delay $\Delta t$ is to be added to $\tau$ of an associated delay element 123. For example, providing a first signal level (e.g. a high level) to d number of the D digital inputs a delay element 123 and a second signal level (e.g. a low level compared to said high level) to the remaining (=D−d) number of digital inputs of the delay element 123 may cause the delay element 123 to add d units of $\Delta t$ to $\tau$ for the delay element 123.

The control signal Rx_fine may be a digital thermometer coded control signal of A*D bits. A thermometer coded control signal may enable stable and convenient control of the switching of the delay elements 123. In particular, the total propagation delay of the delay line 122 may be increased by $\Delta t$ by changing the state of only one delay element 123 and thus the value of only one bit of the control signal. Using a thermometer code, the control signal may comprise A groups of D bits, wherein each group controls the state of a specific delay element 123. For example Rx_fine may have the format $\{[a_1, \ldots a_D]_1, \ldots, [x_1, \ldots, x_D]_A\}$ wherein $[a_1, \ldots a_D]_1$ controls the state of the D digital inputs of the delay element 123-1 and $[x_1, \ldots, x_D]_A$ controls the state of the D digital inputs of the delay element 123-A.

Alternatively, Rx_fine may be a digital binary coded control signal of $\log_2(A*D)$ bits. Rx_fine may thereby indicate the number of units of $\Delta t$ to be added to the total propagation delay of the delay line 122. The delay line 122 may be arranged to control, based on Rx_fine, the states of the delay elements 123 accordingly. For example, the delay line 122 may be arranged to apply a binary-to-thermometer code conversion to Rx_fine wherein a code having the format illustrated in the previous paragraph may be obtained.

Although being referred to as a digital control signal, it is also possible to control the switching of the delay elements 123 using an analog control signal Rx_fine. Rx_fine may for example be an analog signal indicating to the delay line 122 the number of delay elements to be switched to each state using frequency or amplitude modulation. The delay line 122 may include a de-modulator for decoding the information and thereafter control the switching of the delay elements 123 accordingly.

According to one embodiment each one of the delay elements 123 includes a logic circuit element and a variable capacitive load, wherein each delay element is switchable between its respective states by varying a capacitive load of the logic circuit element. The capacitive load may be arranged at the output of the associated logic circuit element. More specifically, the logic circuit elements of the delay elements 123 may be interconnected wherein an interconnection between adjacent logic circuit elements includes the variable capacitive load. By varying the capacitive load for a delay element between two or more levels the delay element may be switched between two or more states, each providing a different propagation delay.

Figure 3:
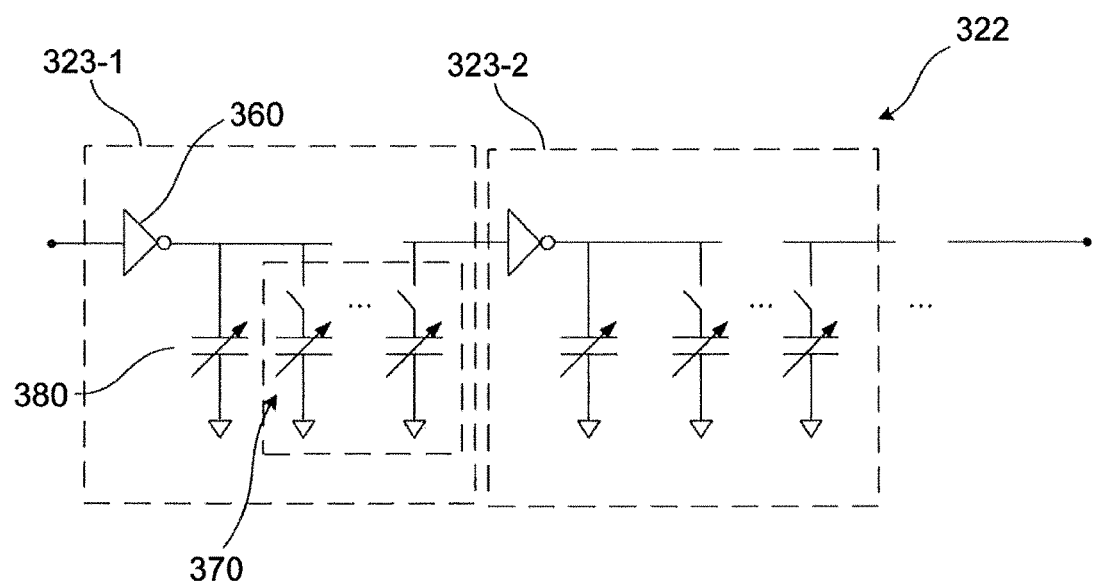
FIG. 3 illustrates a delay line in accordance with one embodiment.

A preferred embodiment of a delay line 322 including delay elements having a variable capacitive load is illustrated in FIG. 3. The delay line 322 may be used as the delay line 122 in the system 100. In the following reference will be made to the delay element 323-1 (corresponding to delay element 123-1), however the discussion applies correspondingly to the further delay elements of the delay line 322. The delay element 323-1 comprises a logic circuit element in the form of an inverter 360. The output of the inverter 360 is connected to an input of an inverter of a subsequent delay element. The delay element 323-1 further comprises a group of one or more varactors, each varactor being switchably connected to the output of the inverter 360. Each varactor and its associated switch (commonly referenced 370) thus forms a variable capacitive load 370 for the inverter 360, which load may be varied between zero (when disconnected) and C (when connected), C being the capacitance of the varactor of the variable capacitive load 370 such that the propagation delay of the delay element 323-1 is increased by $\Delta t$. Each connected varactor may thus increase the time required for the output of the delay element 323-1 to reach a trigger level of the subsequent delay element by $\Delta t$. With reference to the previous discussion the number of variable capacitive loads 370 of the delay element 323-1 may be denoted D. According to an alternative arrangement, the switch of each variable capacitive load 370 may instead be arranged between the varactor and ground. In any case, the switches may be controllable by the control signal Rx_fine as described above. For example, the switch connected to each varactor of a variable capacitive load 370 may be controlled based on a signal received at an associated digital input of the delay line 322.

The delay element 323-1 further comprises a varactor 380 which is permanently connected to the output of the inverter 360. When the switch of each of the D variable capacitive loads 370 is open, the propagation delay of the delay element 323-1 (denoted $\tau$) is defined by the propagation delay of the inverter 360 and the capacitance of the varactor 380. The varactor 380 thus enables the propagation delay $\tau$ of the delay element 323-1 to be tuned within a range $\tau_{min}$ to $\tau_{max}$ determined by the limits of the tuning range of the varactor 380. This tuning may for example be used for calibrating the delay line 323, as will described below. In case tuning not is necessary the varactor 380 may be omitted wherein the propagation delay τ of the delay element 323-1 will be defined by the propagation delay of the inverter 360.

The varactors of the delay element 323-1 may for example be varactor diodes, MOSFET varactors, Shottky-diode varactors. These types of varactors allow the capacitance to be varied by controlling the depletion region. A further example is a MEMS varactor wherein the capacitance may be varied by mechanically adjusting the separation between the capacitor plates by controlling an electrical field applied to the varactor. Implementing the capacitive loads using varactors provides the advantage of enabling the capacitive loads (e.g. C) to be tuned. Thus, Δt provided by each variable capacitive load 370 may be tuned within a range $\Delta t_{min}$ to $\Delta t_{max}$ determined the limits of the tuning range of the varactors. This may improve the flexibility of the delay line 322 by introducing further degrees of freedom. This tuning may for example be used for calibrating the delay line 323, as will described below. Varactors may also allow post-manufacturing adjustment to ensure that Δt is substantially constant throughout the adjustment range of the total propagation delay of the delay line 322. However, if such tunability is not required a variable capacitive load capacitive load may also be provided by one or more capacitors having fixed and well-defined capacitances and being switchably connected to the output of the inverter 360. Additionally, as discussed above, other types of logic circuit elements may be used instead of the inverter 360.

Although in FIG. 3 all delay elements includes a group of D number of varactors having a same capacitance C, other arrangements are also possible. For example a delay element 323-1 may include a switchably connected varactor/capacitor of capacitance C, a delay element 323-2 may include a switchably connected varactor/capacitor of capacitance 2*C or two parallel varactors/capacitors of capacitance C connected to the output of the associated inverter via a same switch, and so on up to a delay element 323-A including a switchably connected varactor/capacitor of capacitance $2^{(A-1)}*C$ or $2^{(A-1)}$ parallel varactors/capacitors of capacitance C connected to the output of the associated inverter via a same switch. The total propagation delay of such a delay line would be controllable using a binary coded control signal, each bit position controlling the state of the switch for a respective delay element.

According to an alternative embodiment of a delay line, a delay element may be switched between its respective states by varying a capacitive load of the logic circuit element by varying the capacitance of a controllable varactor between at least a first capacitance $C_1$ a second capacitance $C_2$ ($C_2 > C_1$). A variable capacitive load may thus be arranged without using switches. With reference to the previous discussion each delay element may for example include D number of such controllable varactors. Each delay element may thereby be switched between D+1 different states.

With reference to FIG. 2, according to an alternative embodiment each one of the delay elements 123 comprises a logic circuit element and is arranged to be switchable between its respective states by varying a current supplied to the logic circuit element. By varying the current supplied to a logic circuit element of a delay element between two or more levels the delay element may be switched between two or more states, each providing a different propagation delay.

Figure 4:
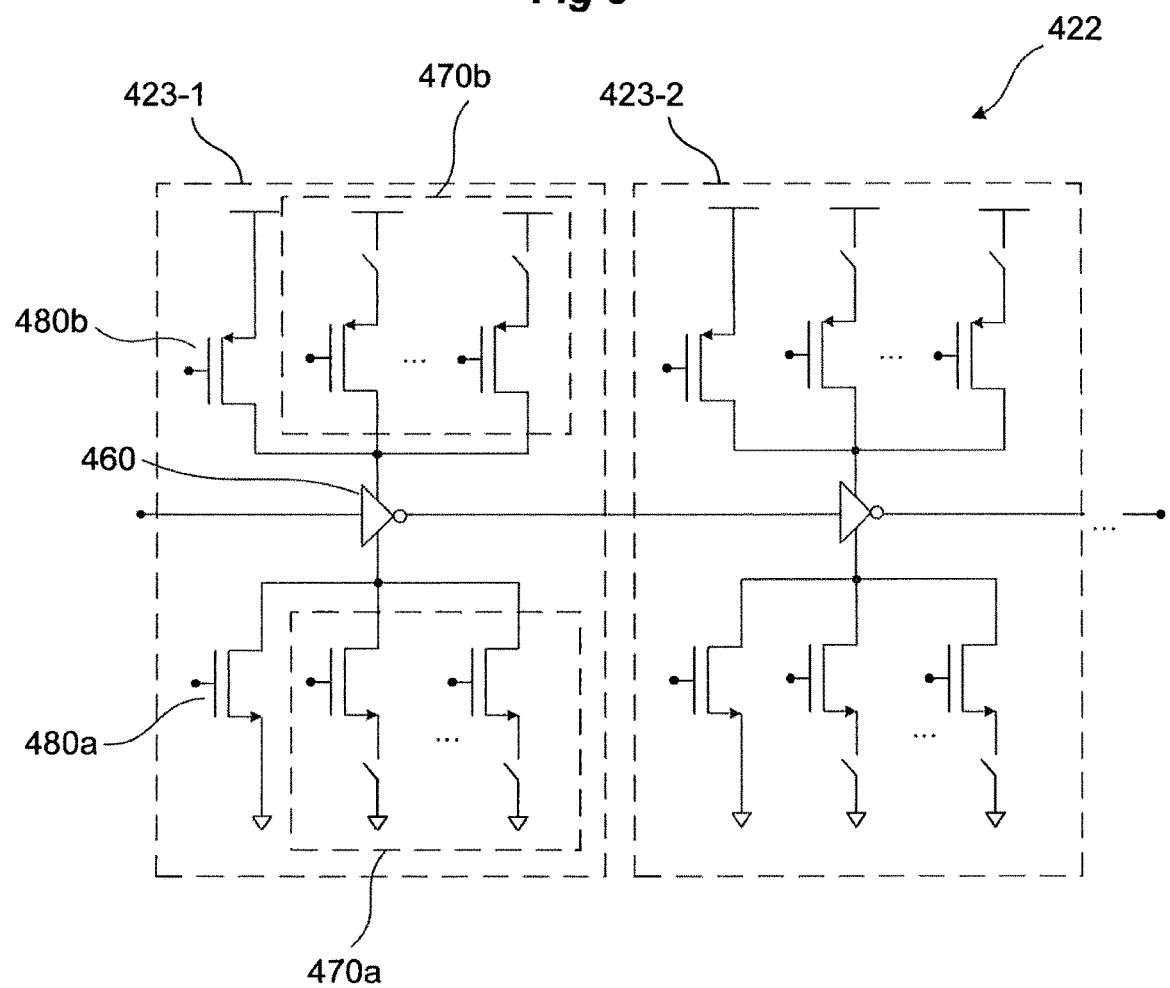
FIG. 4 illustrates a delay line in accordance with one embodiment.

A preferred embodiment of a delay line 422 including delay elements being switchable by varying the supply current is illustrated in FIG. 4. The delay line 422 may be used as the delay line 122 in the system 100. In the following reference will be made to the delay element 423-1 (corresponding to delay element 123-1), however the discussion applies correspondingly to the further delay elements of the delay line 422. The delay element 423-1 comprises an inverter 460 and a group of D number of current limiting transistors 470a and 470b arranged in pairs and being arranged to vary a charge and discharge current, respectively of the inverter 460 by limiting the current supplied to the inverter 460. Each pair of current limiting transistors 470a and 470b is switchable between a state in which the current limiting transistor limits the current of the inverter 460 to a non-zero value and a state in which the current limiting transistor does not supply a current to the inverter 460. In FIG. 4 a respective switch is arranged between an associated current limiting transistor 470a and ground, however a same function may also be provided by arranging the switch between the current limiting transistor 470a and the inverter 460. This is also the case for the current limiting transistor 470b and respective switch. The delay element 423-1 further comprises a current limiting transistor 480a and 480b arranged to limit the current of the inverter 460. The current limiting transistor 480a and 480b are permanently connected to the inverter 460.

As may be understood by the person skilled in the art, in the circuit implementation illustrated in FIG. 4 the current limited by the current limiting transistors 470a and 480a may control the fall time of the output of the inverter 460 and thus only the output high-to-low propagation delay of the inverter 460. Correspondingly, the set of current limiting transistors, 480b and 470b, may control the rise time of the output of the inverter 460, which corresponds to the output low-to-high propagation delay. Preferably, the current limiting transistors 470a and 470b may be connected in D pairs such that the propagation delay of the delay element 423-1 is independent of rising or falling edge propagation. However, the implementation is not limited by using both current limiting transistors 470a and 470b or that they are controlled in pairs.

In a first state of the delay element 423-1, each current limiting transistor 470a and 470b may be connected to the inverter 460. In the first state, the sum of currents of the current limiting transistors 470a and 480a respectively 470b and 480b are arranged such that the propagation delay for the delay element 423-1 is τ. Preferably, the sum of currents supplied to the inverter 460 by the current limiting transistor 470a (i.e. when connected) and the current limiting transistor 480a respectively the current limiting transistor 470b (i.e. when connected) and the current limiting transistor 480b is such that the inverter 460 operates in a regime where the charge/discharge current is mainly limited by the inverter 460. By disconnecting the current limiting transistors 470a and 470b in a pair wise manner, one pair after another, the inverter 460 may enter an (increasingly) current limited regime. More specifically, by disconnecting one pair of the current limiting transistors 470a and 470b (and thus switching the delay element 423-1 to a different state) the total current supplied to the inverter 460 will decrease by an amount equal to the current limited by the disconnected pair of current limiting transistors 470a and 470b. The decrease in current supplied to the inverter 460 is such that the propagation delay of the inverter 460, and thus the delay element 423-1 is increased by Δt. By controlling the number of current limiting transistors 470a and 470b pairs supplying current to the inverter 460 the propagation delay for the delay element 423-1 may thus be varied between τ and τ+D*Δt. The state of each current limiting transistor pair 470a and 470b may be controllable by the control signal Rx_fine as described above. For example, the switch connected to each current limiting transistor pair 470a and 470b may be controlled based on a signal received at an associated digital input of the delay line 422.

Analogous to the discussion in connection with FIG. 3, all delay 423 elements need not include a same number of current limiting transistors. For example, similar to the varactors above, a delay element 323-$i$ may include $2^{(i-1)}$ parallel current limiting transistors, each limiting the current supplied to the inverter by an amount increasing the propagation delay by $\Delta t$.

The limiting current of the current limiting transistors 470a and 470b may be tunable. Implementing the current limiting transistors 470a and 470b as controlled current limiters provides the advantage of enabling the limited current to be tuned. This may improve the flexibility of the delay line 422 by introducing further degrees of freedom. It may further enable analog calibration of the delay line 422 as will be described in detail below. Controlled current limiting transistors may also allow post-manufacturing adjustment to ensure that $\Delta t$ is substantially constant throughout the adjustment range of total propagation delay of the delay line 422. The controlled current limiting transistors 470a and 470b may for example be implemented as current mirrors. Also the current limiting transistors 480a and 480b may have a tunable limiting current. Advantages of arranging also the current limiting transistors 480a and 480b with a tunable limiting current may be understood from the below. However, the current limiting transistor with tunable limiting current may be implemented using other types of current limiting devices such as tunable resistors. Additionally, as discussed above, other types of logic circuit elements may be used instead of the inverter 460.

Furthermore, the propagation delay of a delay element may also be controlled by controlling the voltage supplied to a logic circuit element of the delay element. The level of the supply voltage may be generated by a configurable low drop-out regulator to both generate a voltage which corresponds to current limiting transistor pair 480a and 480b, and voltages corresponding to the switchable current limiting transistor pair 470a and 470b.

In the above, reference has been made to the parameters A, $\tau$, D and $\Delta t$. As will be understood by a person skilled in the art the actual values of A, $\tau$, D and $\Delta t$ are design choices which may vary for different implementations and applications of the system 100. As a non-limiting example applicable for mm-wave applications, the propagation delay of logic circuit element of a delay element 123, 323, 423 (e.g. an inverter) may be in the range of 15 to 30 picoseconds and the step size of $\Delta t$ in the range of 0.5 to 10 picoseconds. Further, if, for example, the number of delay elements A is 10 and the number of switchable states D+1 of each delay elements is 20, each state adding $\Delta t$ to the propagation delay of the delay element 123, 323, 423, the total propagation delay of the delay line 122, 322, 422 would be adjustable between 200 picoseconds and 400 picoseconds.

Returning to FIG. 2, the timing circuitry 118 may further comprise trigger circuitry, which in FIG. 2 is represented by the trigger circuit 124 and the trigger circuit 126. The trigger circuit 124 is arranged to receive the delayed reference clock signal from the delay line 122 and output the trigger signal Rx_trigg after a configurable integer number of periods Rx_coarse of the delayed reference clock signal. As may be understood from the above the period of the delayed reference clock signal output from the delay line 122 is T_ref. The number of periods Rx_coarse may be controlled by the controller 120. The controller 120 may for example provide a digital signal indicating the value of Rx_coarse in a binary format to a digital input Rx_coarse of the trigger circuit 124. The value of Rx_coarse may be recorded in a register of the trigger circuit 124. The trigger circuit 124 may further include a counter which is incremented by one in response to receiving a rising or falling edge of the delayed reference clock signal. The trigger circuit 124 may be arranged to output the Rx_trigg signal in response to the counter being equal to Rx_coarse. The trigger circuit 124 may further include a reset input Reset enabling the controller 120 to reset the counter of the trigger circuit 124 to zero by providing a first predetermined control signal. The trigger circuit 124 may further be arranged to be unresponsive to received clock signals for a duration of the reset control signal. The trigger circuit 124 may be arranged to become responsive to received clock signals in response to the controller 120 providing a second predetermined control signal to the reset input Reset. The Reset input may hence be used to control the repetition frequency of the wavelet generation (i.e. the pulse repetition frequency).

As illustrated in FIG. 2 the system 100 may further comprise a trigger circuit 126 arranged to receive the reference clock signal Ref_clock and output the trigger signal Tx_trigg after a configurable number of periods Tx_coarse of the reference clock signal Ref_clock. The control signal Tx_coarse may be transmitted to the trigger circuit 126 on a serial or a parallel bus. The description of the trigger circuit 124 applies correspondingly to the trigger circuit 126 and will therefore not be repeated.

By the delay line 122, the trigger circuit 124 and the additional trigger circuit 126 a delay between (i.e. a relative timing of) the output of Tx_trigg and the output of Rx_trigg may be controlled by the controller 120. More specifically the delay may be controlled in a digital manner. In particular the timing difference may be expressed as:

$$\text{Delay} = (Rx\_\text{coarse} - Tx\_\text{coarse}) * T\_\text{ref} + Rx\_\text{fine} * \Delta t + A * \tau \qquad \text{(Eq. 1)}$$

The controller 120 may include a calculation unit arranged to determine the variables Rx_coarse, Tx_coarse and Rx_fine based for a desired value of Delay provided to the controller 120 and the parameters $\tau$, $\Delta t$ and A. The system 100 thus enables changes to the delay between a transmission of a wavelet and a generation of a reference wavelet which are greater than T_ref to be achieved by the controller 120 varying Tx_coarse and/or Rx_coarse. Meanwhile, changes which are smaller than T_ref may be achieved by the controller 120 varying Rx_fine. The trigger circuitry formed by the trigger circuits 124 and 126 thus provides a "coarse delay control" with a step size or resolution of T_ref. Meanwhile the delay line 122 provides a "fine delay control" with a step size or resolution of $\Delta t$.

In an alternative embodiment, an analogous function may be obtained if the delay line 122 is arranged to output the delayed reference clock signal to the trigger circuit 126 instead of to the trigger circuit 124. In a further alternative embodiment, the trigger circuitry formed by the trigger circuit 124 and 126 may be omitted from the timing circuitry 118 wherein the first and second pulse generators 114 and 116 may be arranged to output P_tx and P_rx, respectively, in response to receiving the reference clock signal Ref_clock and the delayed reference clock signal output by the delay line 122, respectively. In such an embodiment the reference clock signal Ref_clock and the delayed reference clock signal may function as trigger signals for the generation of a transmit wavelet and a reference wavelet. This embodiment may be used in applications where delay adjustment range of the delay line 122 meets the maximum delay requirements for the application. In a further alternative embodiment the trigger circuit 124 may be arranged before the delay line 122 and thus be arranged to receive the reference clock signal Ref_clock and output the trigger signal Rx_trigg to the delay line 122. The delay line 122 may thus be arranged to receive Rx_trigg at the input of the delay line 122 and transmit Rx_trigg at the output of the delay line 122 after the total propagation delay of the delay line. The second pulse generator 126 may further be arranged to output P_rx in response to receiving Rx_trigg from the delay line 122.

Optionally, a tap may be arranged at the output of the trigger circuit 124 for providing the trigger signal ADC_trigg for triggering an ADC to sample and digitize the output W_int from the correlator circuit 111.

Alternatively, or additionally, the trigger circuits 124 and 126 may be arranged to count a number of both rising and falling edges of the received clock signal. For a reference clock signal having a duty cycle of 50% this enables trigger circuits 124 and 126 to output the trigger signals Tx_trigg and Rx_trigg after a configurable number of half periods of length T_ref/2. If the trigger circuits 124 and 126 are arranged to count both rising and falling edges the term T_ref in Eq. 1 should be replaced by T_ref/2.

Figure 5:
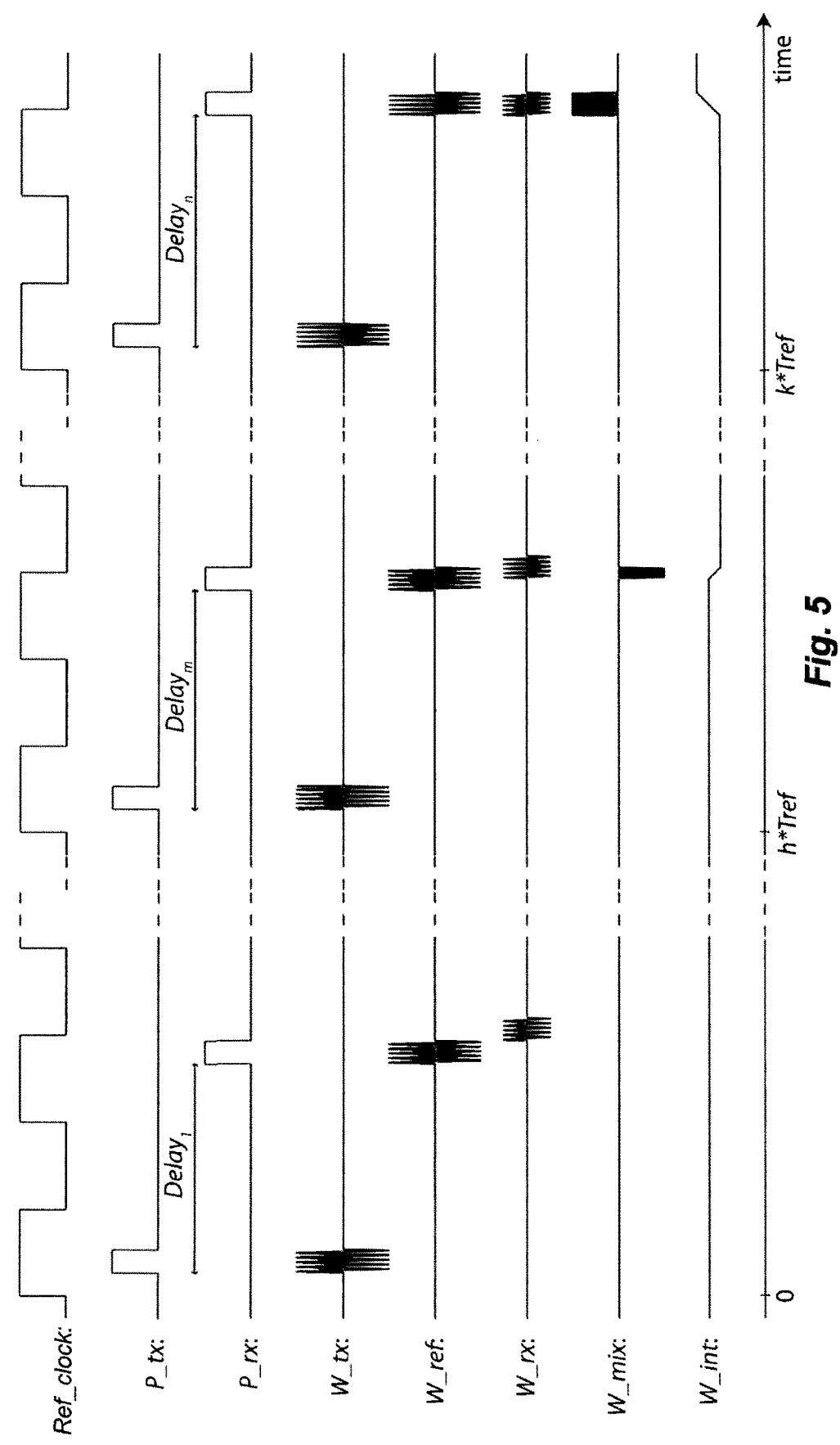
FIGS. 5-7 illustrates aspects of an embodiment of a transmitter-receiver system in use.

An example describing the system 100 in a measurement mode of operation will now be given with reference to FIGS. 5-7. The trigger signals Tx_trigg and Rx_trigg triggers the first and the second pulse generators 114, 116 wherein a first and a second pulsed signal P_tx and P_rx are generated. The delay between P_tx and P_rx is given by Eq. 1 and is configured by the controller 120 determining values of Rx_coarse, Tx_coarse and Rx_fine to obtain the desired delay ("Delay" in Eq. 1). P_tx triggers the first wavelet generator 104 to generate a wavelet W_tx for transmission by the transmitter 102. After reflection by one or several objects the wavelet may be received by the second antenna 112 of the receiver 108. The output of the antenna 112 W_rx is coupled to the correlator circuit 111 and mixed with a reference wavelet W_ref received from the second wavelet generator 110. The mixed signal W_mix may then be provided to the integrator. As described above the integrated signal W_int may be sampled by an ADC and supplied to a DSP for further processing. These steps may be repeated for a plurality of different delays between the transmission of a wavelet W_tx and the generation of a reference wavelet W_ref to determine a set of correlations. Identical delays may be used for more than one measurement to enable averaging of W_rx, W_mix and/or W_int and increase the SNR for a certain delay. The delay for which W_int is maximum corresponds to the time of flight of a transmitted wavelet (W_tx), then reflected and thereafter received wavelet (W_rx).

Figure 6:
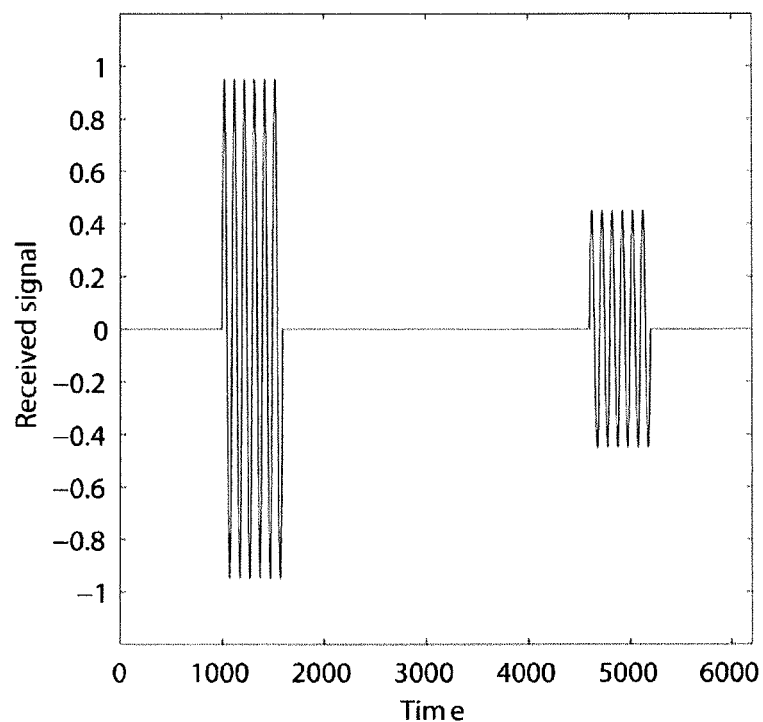
Figure 7:
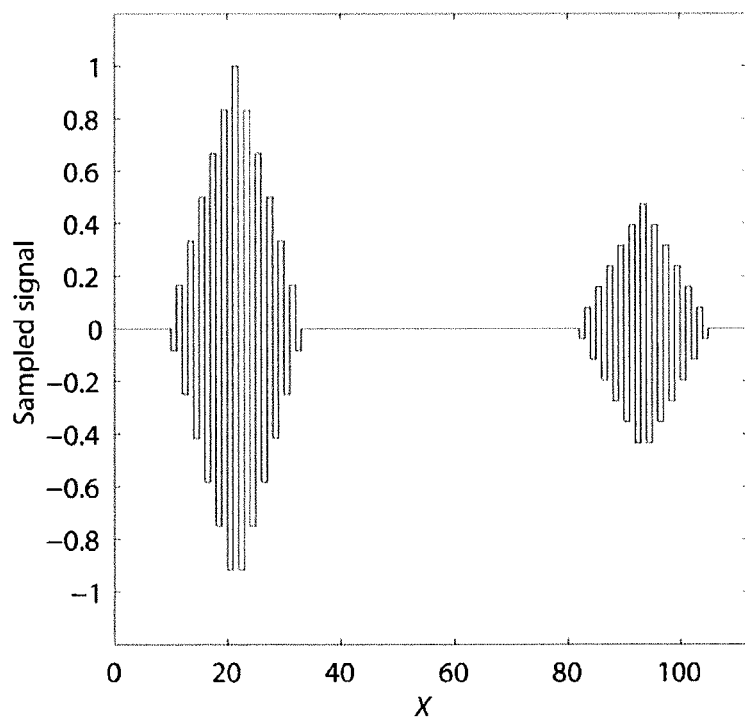

FIG. 6 illustrates a received signal in a situation where two objects are present within the range of the system 100. FIG. 7 illustrates a set of correlations resulting from mixing and integrating the received signal in FIG. 6 with a reference wavelet W_ref for a plurality of different delays between W_tx and W_ref. The set of correlations are shown as a function of an integer X, representing the relative delay between W_ref and W_tx in units of Δt (or analogously the relative delay between Tx_trigg and Rx_trigg). The two reflections may be individually identified if they are separated by at least the wavelet length (which may be controlled by the duration of P_tx, i.e. Ptx_dur as described above). The algorithm which may describe the process of retrieving the set of correlations in FIG. 7 may be described as a two level nested loop function. The X-value corresponds to the delay setting Delay of ALU 850, where the Delay equal to zero may correspond to Tx_coarse, Rx_coarse, and Rx_fine all equal to zero as an example. Further, the Delay equal to one may correspond to Rx_fine equal to one while Tx_coarse and Rx_coarse are still zero. After each correlation, Delay may be increased by one step which will affect the Rx_fine value, such that for each stepwise increase of Delay the Rx_fine value may also increase stepwise. However, when Rx_fine has reached its maximum value (i.e. when the total propagation delay of the delay line is maximized), it is reset to zero while Rx_coarse is increased one step. This is repeated until the Delay has reached the maximum X-value found in FIG. 7.

Although the system 100 in the above has been described in the context of a range-finding or radar application the system 100 may also be used in other contexts. For example the system 100 may be used for detecting proximity of an object by fixing the delay between to a specific value and monitor for a correlation between the reference wavelet and a received wavelet exceeds a predetermined threshold value, thus indicating that an object reflecting the transmitted wavelet is present at a distance corresponding to the specific delay value.

As may be understood from the above, the system 100 provides two independently controllable mechanisms of adjusting a relative timing of the Tx_trigger signal and the Rx_trigger signal: a coarse delay control controlling Tx_coarse and Rx_coarse and a fine delay control controlling Rx_fine.

Preferably, the system 100 is arranged such that the adjustment range of the fine delay control, i.e. the adjustment range of the total propagation delay of the delay line 122 (or 322 or 422) (or synonymously the dynamic range of the delay line) corresponds to at least one period of Ref_clock of length T_ref (or if applicable T_ref/2). A lower end point of the adjustment range (e.g. the minimum value of the total propagation delay of the delay line 122, i.e. A*τ) is preferably such that the reference clock signal is delayed by an integer number of periods of Ref_clock (i.e. T_ref or if applicable T_ref/2). An upper end point of the adjustment range (e.g. the maximum value of the total propagation delay of the delay line 122, i.e. A*τ+A*D*Δt) preferably differs from the lower end point by T_ref (or if applicable T_ref/2). During design of the system 100 the parameters A, τ, D and Δt and the frequency of the reference clock signal Ref_clock may be chosen such that the desired lower and upper end points are obtained.

In some cases it may be difficult to accurately determine these parameters during design and construction such that the above-mentioned preferred characteristics of the system 100 and the delay line 122 are obtained. For example temperature variations or inaccuracies during manufacturing may result in deviations. Consequently, in some cases the digital-to-time transfer function provided by the timing circuitry 118 may have overlaps or gaps. An "overlap scenario" may result when the dynamic range of the delay line 122, 322 or 422 is greater than the period time T_ref (or T_ref/2). A same delay ("Delay" in Eq. 1) between W_tx and W_ref may thus be obtained for different settings of Tx_coarse and Rx_coarse. This may result in redundant data points and an increased measurement time. Conversely, a "gap scenario" may be exhibited when the dynamic range of the delay line 122, 322 or 422 is smaller than T_ref (or T_ref/2). This may result in loss of data points since the digital-to-time transfer function provided by the timing circuit 118 will have discontinuities with unknown width. In the following embodiments will be described which address these matters.

Figure 8:
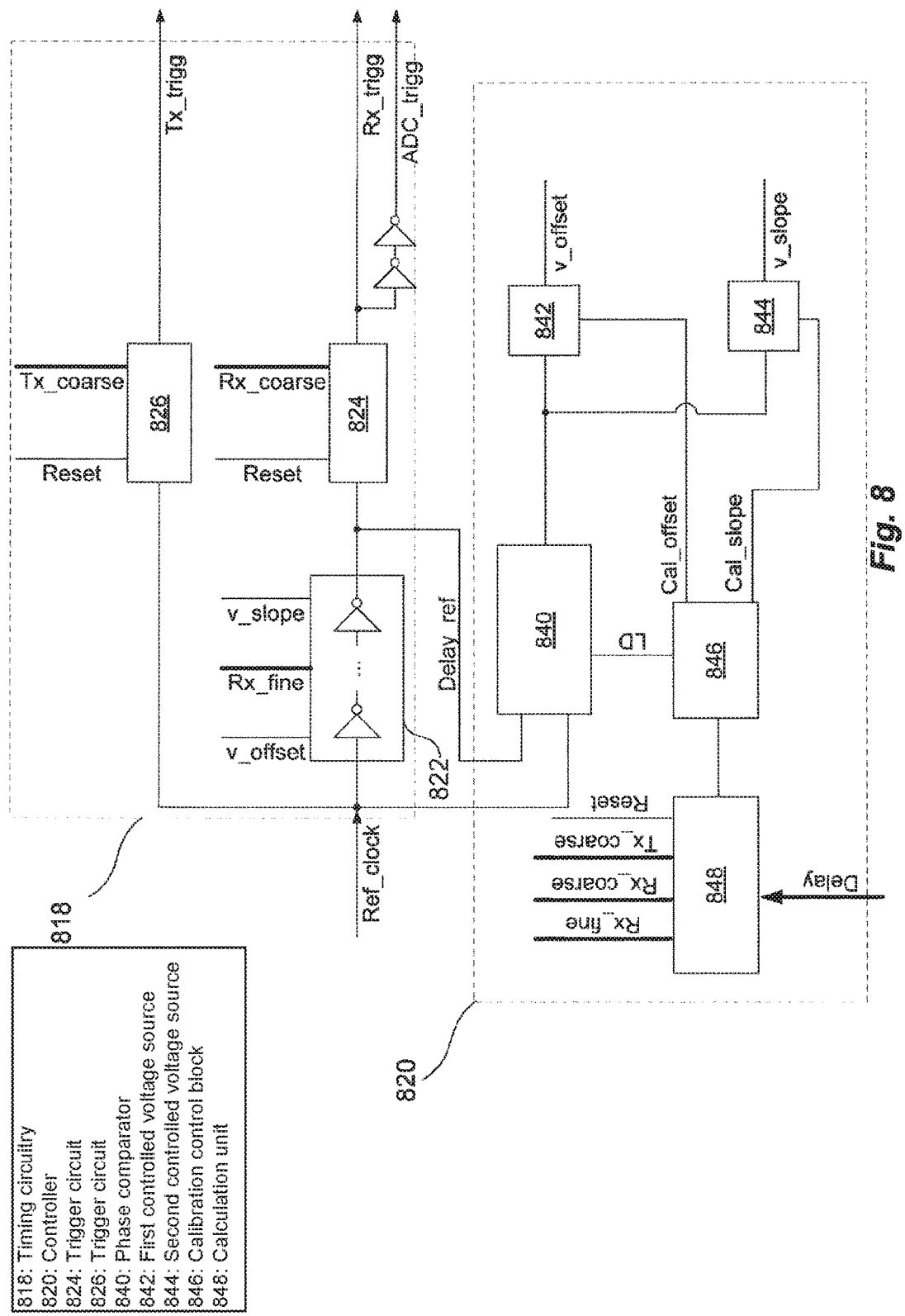
FIG. 8 illustrates an embodiment of a timing circuitry and a controller.

An embodiment of an analog calibration of a delay line will now be described with reference to FIG. 8. In FIG. 8 elements 818-826 correspond to elements 118-126 in FIGS. 1 and 2. The controller 820 is arranged to, during a calibration mode, enter a first operational state (a first stage of the calibration) and set each switchable delay element of the delay line 822 to a respective first state in which each delay element presents a first propagation delay. In particular, the first state of each delay element may be the state for which the delay element presents its minimum propagation delay (e.g. which in line with the above discussion may be τ). The controller 820 is further arranged to, during a one or more periods or half periods of the reference clock signal Ref_clock, tune the first propagation delay of each delay element until a total propagation delay of the delay line 822 corresponds to an integer number of periods $I_1$ of Ref_clock (or half periods of Ref_clock).

The controller 820 is further arranged to enter a second operational state (a second stage of the calibration) and set each switchable delay element to a respective second state in which each delay element presents a second propagation delay. In particular, the second state of each delay element may be the state for which the delay element presents its maximum propagation delay (e.g. which in line with the above discussion may be τ+D*Δt), or at least a propagation delay which is greater than the first propagation delay of the delay element. The controller 820 is further arranged to, during one or more periods or half periods of Ref_clock, tune the second propagation delay of each delay element (e.g. which in line with the above discussion may include tuning Δt) until the total propagation delay of the delay line 822 corresponds to an integer number of periods $I_2$ ($I_2>I_1$, preferably $I_2=I_1+1$) of Ref_clock (or half periods of Ref_clock). The calibration is then complete wherein the controller 820 may start operating in accordance with a measurement mode. In other words, by the calibration a first total propagation delay of the delay line 822 may be tuned to correspond to $I_1$ periods or half periods of Ref_clock and a second total propagation delay of the delay line 822 may be tuned to correspond to $I_2$ periods or half periods of Ref_clock.

As illustrated in FIG. 8 the controller 820 includes a phase comparator 840. The phase comparator 840 is arranged to determine a phase difference between Ref_clock and Delay_ref. The phase comparator 840 may receive Ref_clock and Delay_ref at a respective input and output a signal representing the determined phase difference. If Ref_clock lags Delay_ref the phase comparator 840 may determine a positive phase difference and if Ref_clock leads Delay_ref the phase comparator may determine a negative phase difference, however the opposite function is also possible. The phase comparator 840 may be an analog phase comparator, a digital phase comparator or a phase frequency detector arranged to output a (possibly low-pass filtered) signal with a voltage proportional to the determined phase difference. As a further example, the phase comparator 840 may include a sampling circuit for (while keeping a propagation delay of each delay element of the delay line 822 constant) sampling Ref_clock and Delay_ref during one or more periods of Ref_clock and calculate a phase difference between the sampled clock signals. The calculated phase difference may be converted to a corresponding analog signal using a digital-to-analog converter and thereafter be output by the phase comparator 840.

In an alternative embodiment wherein the input of the delay line 822 is connected to the output of the trigger circuit 824 the timing circuitry 818 may include a signal path arranged in parallel with the trigger circuit 824 and allowing Ref_clock to by-pass the trigger circuit 824 during the calibration mode. The signal path may for example include a switch which may be opened by the controller 820 during a measurement mode and closed by the controller 820 during a calibration mode.

Returning to FIG. 8, the controller 820 comprises a first controlled voltage source 842 arranged to output a first control signal v_offset and a second controlled voltage source 844 arranged to output a second control signal v_slope. The delay line 822 comprises corresponding inputs for receiving v_offset and v_slope from the controller 820. As will be described in detail below, v_offset and v_slope may be used for tuning the total propagation delay of the delay line 822. In FIG. 8 the phase comparator 840 is connected to both voltage sources 842 and 844. However, it would be equally possible to provide a first phase comparator having an output connected to the voltage source 842 and a second phase comparator having an output connected to the voltage source 844. The voltage source 842 may operate in a first mode and a second mode. In the first mode the voltage source 842 is arranged to keep the output voltage of v_offset constant. In the second mode the voltage source 842 is arranged to vary the output voltage of v_offset based on the voltage of the signal received from the phase comparator 840. The controlled voltage source 844 is arranged in a manner analogous to the voltage source 842 however in relation to v_slope instead of v_offset.

The phase comparator 840 may instead of being arranged to output a voltage proportional to the phase difference between Ref_clock and Delay_ref be arranged to output a first predetermined signal if the phase difference is positive, a second predetermined signal if the phase difference is negative and a third predetermined signal if the phase difference is zero (or deviates from zero by less than a threshold value). The predetermined signals may for example present different and predetermined DC voltages. The controlled voltage source 842 may include a charge pump and a sample and hold circuit. An input of the charge pump may be connected to the output of the phase comparator 840. An output of the charge pump may be connected to the sample and hold circuit. The charge pump may be arranged to output a decreasing voltage in response to receiving the first predetermined signal, an increasing voltage in response to receiving the second predetermined signal and a constant voltage in response to receiving the third predetermined signal. In the first mode, the sample and hold circuit outputs v_offset at a voltage which tracks the voltage of the signal received from the charge pump. In the second mode the sample and hold circuit stops tracking the voltage of the signal received from the charge pump and keeps the output voltage of v_offset constant. The voltage source 844 may be arranged in a corresponding manner in relation to v_slope.

If the trigger circuits 824 and 826 are arranged to count a number of rising or falling edges of a clock signal (thus effectively counting a number of periods of the clock signal) the voltage source 842 and the voltage source 844 may, in its second mode, be arranged to control the voltage of v_offset and v_slope, respectively, to achieve a phase difference between Ref_clock and Delay_ref which corresponds to zero degrees (or deviates from zero by less than a threshold). The voltage source 842 and 844 may for example be arranged to determine a voltage level of a signal received from the phase detector 840 and reduce the voltage of v_offset and v_slope, respectively, in response to the determined voltage level indicating a positive phase difference and increase the voltage of v_offset and v_slope, respectively, in response to the determined voltage level indicating a negative phase difference.

Alternatively, if the trigger circuits 824 and 826 are arranged to count both rising and falling edges of a clock signal (thus effectively counting a number of half periods of the clock signal), the voltage source 842 may, in its second mode, be arranged to control the voltage of v_offset to achieve a phase difference between Ref_clock and Delay_ref which corresponds to zero degrees (or deviates from zero by less than a threshold). The voltage source 844 may, in its second mode, be arranged to change the voltage of v_slope to achieve a phase difference between Ref_clock and Delay_ref which corresponds to 180 degrees (e.g. deviates from 180 degrees by less than a threshold). Alternatively, the voltage source 842 may be arranged to change the voltage of v_offset to achieve a phase difference which corresponds to 180 degrees and the voltage source 844 may be arranged to change the voltage of v_slope to achieve a phase difference which corresponds to zero degrees. Other variations are also possible. For example the phase comparator 840 may in the first stage of the calibration be arranged to output a signal representing a deviation of the phase difference from zero and in the second stage of the calibration be arranged to output a signal representing a deviation of the phase difference from 180 degrees, or vice versa.

The controller 820 further comprises a calibration control block COB 846 which is arranged to, during the calibration mode, control the operations of the controller 820. More specifically the COB 846 is arranged to control whether v_offset (in the first operational state) or v_slope (in the second operational state) should be controlled based on the phase difference determined by the phase comparator 840. In the first operational state the COB 846 may cause the voltage source 842 to operate in its second mode and the voltage source 844 to operate in its first mode. In the second operational state the COB 846 may cause the voltage source 842 to operate in its first mode and the voltage source 844 to operate in its second mode. The mode of the voltage source 842 may for example be controlled by a control signal Cal_offset output by the COB 846. Analogously, the mode of the voltage source 844 may for example be controlled by a control signal Cal_slope output by the COB 846. Cal_offset and Cal_slope may for example be digital control signals wherein a first signal level causes the voltage source 842 and 844, respectively, to operate in its first mode and a second signal level causes the voltage source 842 and 844, respectively, to operate in its second mode.

The controller 820 may further comprise a calculation unit 848 arranged to determine and output the control signals Rx_fine, Rx_coarse and Tx_coarse having the respective functions described in connection with FIG. 2. In response to entering the first operational state of the controller 820, the calculation unit 848 is arranged to output a control signal Rx_fine such that each switchable delay element of the delay line 822 is set to its respective first states for the duration of the first operational state. In response to entering the second operational state of the controller 820, the calculation unit 848 is arranged to output a control signal Rx_fine such that each switchable delay element of the delay line 822 is set to its respective second state for the duration of the second operational state. In the calibration mode the COB 846 may for example provide a first predetermined signal (e.g. a signal having a first predetermined voltage) to the computation unit 848 to indicate entry into the first operational state and a second predetermined signal (e.g. a signal having a second predetermined voltage) to indicate entry into the second operational state. Advantageously, during the calibration mode the computation unit 848 may be arranged to output a reset signal Reset to the trigger circuits 824 and 826, causing their counters to be reset and causing the trigger circuits 824 and 826 to become unresponsive to any received clock signals for the duration of the calibration.

To determine when the first and the second stages of the calibration is complete the controller 820 may implement lock detection. For example, as illustrated in FIG. 8 the phase comparator 840 may be arranged to transmit a lock detection signal LD to the COB 846 in response to the phase difference between Ref_clock and Delay_ref falling below a predetermined threshold. In response to receiving the lock detection signal LD for a first time during the calibration mode the COB 846 may cause the controller 820 to transition from the first operational state to the second operational state. In response to receiving the lock detection signal for a second time during the calibration mode the COB 846 may cause the controller 820 to finish the calibration mode and transition into a measurement mode. The lock detection may however also be implemented directly in the COB 846. The COB 846 may for example be arranged to monitor an amplitude of an oscillation of the output of the phase comparator 840 or of v_offset (i.e. in the first operational state) and v_slope (i.e. in the second operational state) as output by the voltage sources 846 and 844, respectively.

According to one embodiment the delay line 822 may be implemented in a same manner as the delay line 322 however with the addition of respective inputs for receiving the control signals v_offset and v_slope from the controller 820. A control terminal of each varactor 380 may be connected to the v_offset input of the delay line 822 wherein the voltage of v_offset may tune the capacitance of the varactor 380 and thus tune a first propagation delay of each delay element (e.g. which in line with the above discussion may be τ). A control terminal of each varactor of the variable capacitive loads 370 of each delay element may be connected to the v_slope input of the delay line 822 wherein the voltage the voltage of v_slope may tune the capacitance of all varactors of the variable capacitive loads 370 and thus tune a second propagation delay of each delay element (e.g. which in line with the above discussion may be τ+D*Δt). In the first operational state, the controller 820 may open the switch of each variable capacitive load 370 of each delay element (e.g. using the control signal Rx_fine). The voltage source 842 of the controller 820 may thereafter tune the first propagation delay of each delay element by controlling the voltage of v_offset until the desired phase relation between Ref_clock and Delay_ref is achieved. In the second operational state, the controller 820 may close the switch of each variable capacitive load 370 of each delay element (e.g. using the control signal Rx_fine). The voltage source 844 of the controller 820 may thereafter tune the second propagation delay of each delay element by controlling the voltage of v_slope until the desired phase relation between Ref_clock and Delay_ref is achieved.

In an alternative embodiment, each delay elements of the delay line 822 need not include a varactor 380. Instead the delay line 822 may include an additional delay element including an inverter similar to the inverter 360 (or some other type of logic circuit element) and a varactor (similar to the varactor 380) connected to the output of the inverter. A control terminal of the varactor of the additional delay element may be connected to the v_offset input of the delay line 822 wherein the capacitance of the varactor and thus the propagation delay of the additional delay element may be tuned by controlling v_offset. In response to initiating the calibration, the controller 820 may enter a first operational state and open the switch of each variable capacitive load 370 as described above. The voltage source 842 of the controller 820 may thereafter tune the capacitance of the varactor of the additional delay element by controlling the voltage of v_offset until the desired phase relation between Ref_clock and Delay_ref is achieved. The controller 820 may thereafter proceed in accordance with the second operational state described in the preceding paragraph.

According to one embodiment the delay line 822 may be implemented in a same manner as the delay line 422 however with the addition of respective control terminals (i.e. inputs) for receiving the control signal v_offset and v_slope from the controller 820. The discussion of the calibration of the delay line 322 in the above applies correspondingly to the present embodiment. However, instead of tuning the capacitance of varactors, v_offset may tune the current limited by the transistors 480a and 480b of each delay element and v_slope may tune the current limited by the transistors 470a and 470b of each delay element (i.e. the current limited when associated switches of the transistors 470a and 470b are closed).

Calibrating the delay line 822 in accordance with any of the above embodiments enables an accurate control of the step size Δt. A short and well-defined Δt allows, among others, for high accuracy estimation of distances to objects. An estimate of the step size Δt of the delay line 822 (and thus the step size of the digital-to-timing transfer function provided by the timing circuitry 818) may be obtained as T_ref/(A*D) or T_ref/(A*D*2). More generally, the step size may be determined by dividing T_ref or T_ref/2 by the total number of steps in which the total propagation delay of the delay line 822 may be changed. Additionally, the calibration enables the linearity of the control over the delay between a transmitted wavelet and a reference wavelet to be improved and the digital-to-time transfer function provided by the timing circuit 818 to be improved since the difference between the dynamic range of the delay line 822 and the period time T_ref or T_ref/2 may be minimized.

In the above embodiments the controller 820 is advantageously arranged to, in the first operational state, open each switch of each variable capacitive load 370 (or close each switch associated with each transistor 470a, 470b) of each delay element of the delay line 822 and, in the second operational state, close each switch of each variable capacitive load 370 (or open each switch associated with each transistor 470a, 470b) to thereby maximize the number of steps in which the total propagation delay of the delay line 822 may be adjusted between $I_1$*T_ref and $I_2$*T_ref (or $I_1$*T_ref/2 and $I_2$*Tref/2), and thus minimize the step size. However if a minimum step size not is critical in a particular application it is in principle possible to open and close only a subset of the switches of the delay elements during the first and second operational state, respectively, without departing from the principles of the analog calibration.

In the above the control signals v_offset and v_slope have been described as analog control signals. However alternative implementations are also possible. For example, the controller 820 need not include the first and second controlled voltage sources 842 and 844. Instead, the controller 820 may directly output the signal representing the phase difference between Ref_clock and Delay_ref to the delay line 822. The delay line 822 may include circuitry providing a same functionality as the voltage sources 842 and 844, as described above. The controller 820 may additionally provide a control signal indicating to the delay line 822 (e.g. using a first and second predetermined voltage level) whether the varactors 370 or 380 (or transistors 480a, b or 470a, b) should be controlled based on the phase difference.

Figure 9:
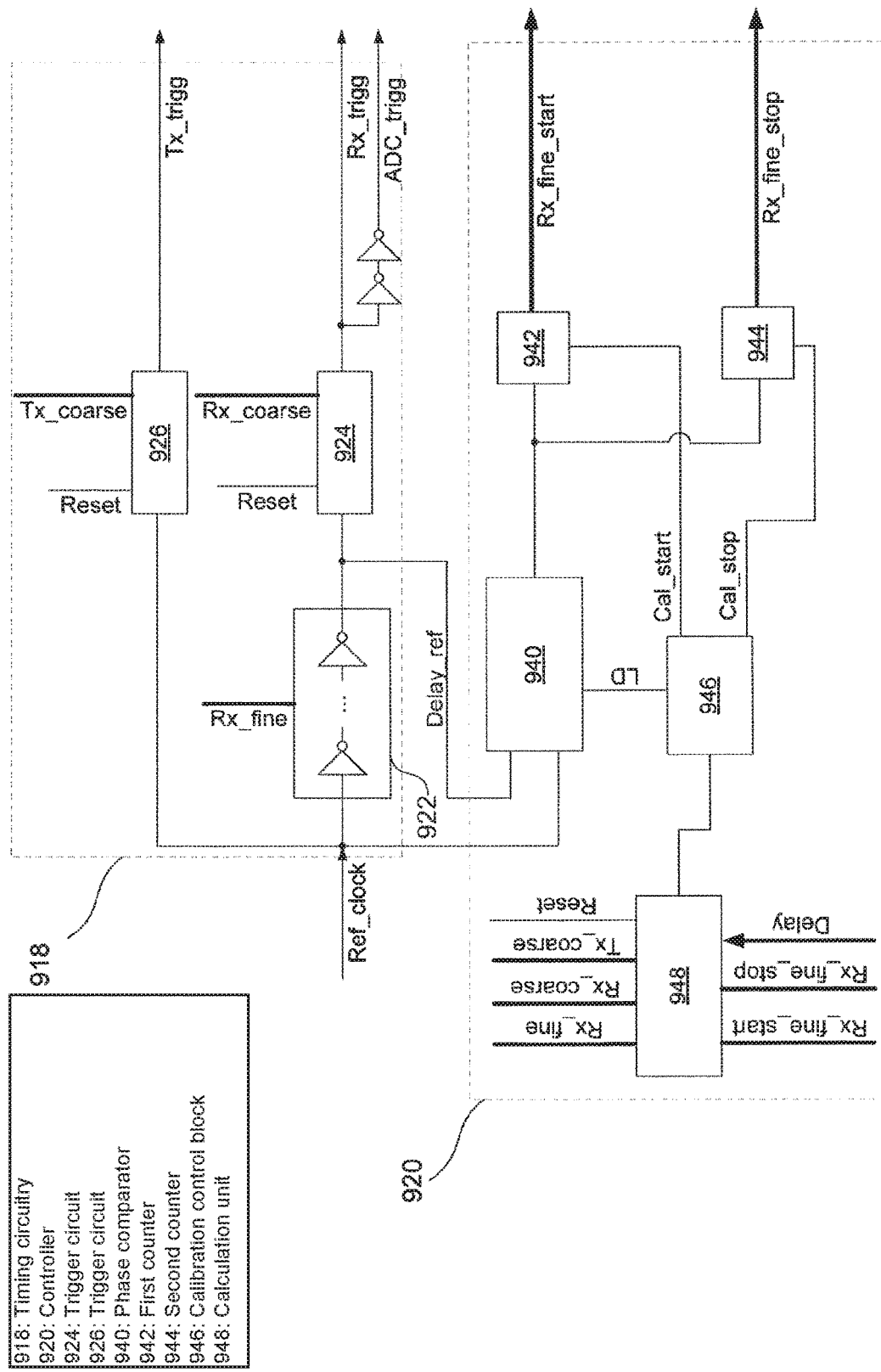
FIG. 9 illustrates an embodiment of a timing circuitry and a controller.

According to one embodiment an overlap or gap scenario may be addressed using, what may be referred to as, a digital calibration of a delay line. An embodiment of a digital calibration of a delay line will now be described with reference FIG. 9. In FIG. 9 elements 918-940 correspond to elements 818-840 in FIG. 8. The controller 920 is arranged to, during a calibration mode, enter a first operational state (a first stage of the calibration) and determine a first setting of the states of the switchable delay elements of the delay line 922 such that the first setting results in a total propagation delay of the delay line 922 which corresponds to a first integer number $I_1$ of periods of Ref_clock (or half periods of Ref_clock). The controller 920 is further arranged to enter a second operational state (a second stage of the calibration) and determine a second setting of the states of the switchable delay elements of the delay line 922 such that the second setting results in a total propagation delay of the delay line 922 which corresponds to a second integer number $I_2$ of periods of Ref_clock (or half periods of Ref_clock) ($I_2 > I_1$, preferably $I_2 = I_1 + 1$).

In line with the above discussion the first setting may correspond to a first value or configuration of Rx_fine and the second setting may correspond to a second value or configuration of Rx_fine. By varying Rx_fine between the first value and the second value the total propagation delay of the delay line 922 may thus be adjusted between a first end point corresponding to $I_1$ periods of Ref_clock (or half periods of Ref_clock) and a second end point corresponding to $I_2$ periods of Ref_clock (or half periods of Ref_clock). Overlaps or gaps in the digital-to-time transfer function provided by the timing circuitry 918 may thus be avoided by varying Rx_fine between and not beyond the first and second end points.

As may be understood a calibration in accordance with the above is particularly efficient if used in combination with a delay line which is configurable to provide a plurality of different total propagation delays, ranging from a minimum total propagation delay (e.g. which in line with the previous discussion may be A*τ) to a maximum total propagation delay (e.g. which in line with the previous discussion may be A*D*Δt) and being adjustable between the minimum and maximum propagation delay in a plurality of steps of equal size (e.g. of size Δt), and wherein the minimum total propagation delay is smaller than $I_1$*T_ref (or $I_1$*T_ref/2) and the maximum total propagation delay is greater than $I_2$*T_ref (or $I_2$*T_ref/2).

After calibration, an estimate of the step size Δt may be obtained by dividing the T_ref (or T_ref/2) by the number of steps in which the total propagation delay of the delay line 922 may be adjusted between the determined first and the second end points of the adjustment range. A maximum error of this estimate will be Δt.

In the first (and the second) operational state of the calibration mode, the controller 920 is advantageously arranged to repeatedly determine a phase difference between Ref_clock and Delay_ref and change the states of one or more delay elements of the delay line 922 until the determined phase difference differs from zero by less than a threshold. If calibrating in relation to half periods of Ref_clock, the controller 920 may in its first operational state change the states of one or more delay elements of the delay line 922 until the determined phase difference differs from zero (or 180 degrees) by less than a threshold, and in its second operational state change the states of one or more of the delay elements of the delay line until the determined phase difference differs from 180 degrees (or zero degrees) by less than a threshold. The phase difference is determined by a phase comparator 940, similar to the phase comparator 840.

Instead of the voltage sources 842 and 844, the controller 920 comprises a first counter 942 and a second counter 944. The first counter 942 may operate in a first mode and a second mode. The first counter 942 includes a register storing the value of a count variable Rx_fine_start. The first counter 942 is arranged to output a signal representing the currently stored value of Rx_fine_start to the calculation unit 946 of the controller 920. In the first mode the first counter 942 is arranged to maintain the current value of Rx_fine_start. In the second mode the first counter 942 is arranged to increase or decrease the value of Rx_fine_start based on the phase difference between Ref_clock and Delay_ref. The second counter 944 is arranged in a manner analogous to the first counter 942 however includes a register storing the value of a count variable Rx_fine_stop.

If the trigger circuits 924 and 926 are arranged to count a number of rising or falling edges of a clock signal (thus effectively counting a number of periods of the clock signal) the phase comparator 940 may be arranged to output a first predetermined signal in each period (or half period) of Ref_clock in which the phase difference is negative, a second predetermined signal in each period (or half period) of Ref_clock in which the phase difference is positive and a third predetermined signal in each period (or half period) of Ref_clock in which the phase difference deviates from zero by less than a predetermined threshold. When the first counter 942 is in its second mode the first counter 942 may increase the value of Rx_fine_start in response to receiving the first predetermined signal, decrease the value of Rx_fine_start in response to receiving the second predetermined signal and maintain the value of Rx_fine_start in response to receiving the third predetermined signal. The second counter 944 may operate analogously however with respect to Rx_fine_stop.

Alternatively, if the trigger circuits 924 and 926 are arranged to count both rising and falling edges of a clock signal (thus effectively counting a number of half periods of the clock signal), the phase comparator 940 may be arranged to, in the first stage of the calibration, output a first predetermined signal in each period (or half period) of Ref_clock in which the phase difference is negative, a second predetermined signal in each period (or half period) of Ref_clock in which the phase difference is positive and a third predetermined signal in each period (or half period) of Ref_clock in which the phase difference deviates from zero by less than a predetermined threshold, and in the second stage of the calibration, output a fourth predetermined signal in each period (or half period) of Ref_clock in which the phase difference falls below 180 degrees, a fifth predetermined signal in each period (or half period) of Ref_clock in which the phase difference exceeds 180 degrees and a sixth predetermined signal in each period (or half period) of Ref_clock in which the phase difference deviates from 180 degrees by less than a predetermined threshold. When the first counter 942 is in its second mode the first counter 942 may increase the value of Rx_fine_start in response to receiving the first predetermined signal, decrease the value of Rx_fine_start in response to receiving the second predetermined signal and maintain the value of Rx_fine_start in response to receiving the third predetermined signal. When the second counter 944 is in its second mode the second counter 944 may increase the value of Rx_fine_stop in response to receiving the fourth predetermined signal, decrease the value of Rx_fine_stop in response to receiving the fifth predetermined signal and maintain the value of Rx_fine_stop in response to receiving the sixth predetermined signal. Alternatively, the second counter 944 may be responsive to the first to third predetermined signals and the first counter 942 may be response to the fourth to sixth predetermined signals when in their respective second modes.

Similar to the COB 846, the COB 946 is arranged to, during the calibration mode, control the operations of the controller 920. More specifically the COB 946 is arranged to control whether the counters 942 and 944 should update the values of Rx_fine_start or Rx_fine_stop, respectively. In the first operational state the COB 946 may cause the first counter 942 to operate in its second mode and the second counter 944 to operate in its first mode. In the second operational state the COB 946 may cause the first counter 942 to operate in its first mode and the second counter 944 to operate in its second mode.

The controller 920 further comprises the calculation unit 948 which corresponds to the calculation unit 848. However, the calculation unit 948 is further arranged to receive a signal from the counter 942 which signal represents the currently stored value of Rx_fine_start. The calculation unit 948 is further arranged to receive a signal from the second counter 944 which signal represents the currently stored value of Rx_fine_stop. In response to entering the first operational state of the controller 920, the calculation unit 948 is arranged to output a control signal Rx_fine corresponding to the current value of Rx_fine_start, thereby causing the switchable delay element of the delay line 922 to be set to the particular setting indicated by Rx_fine. During the first operational state the value of Rx_fine_start will increase and decrease until a desired phase relation between Ref_clock and Delay_ref has been achieved. An increase or decrease of Rx_fine_start will cause a corresponding change of the control signal Rx_fine wherein the setting of the switchable delay elements of the delay line 922 will change. In response to entering the second operational state of the controller 920, the calculation unit 948 is arranged to output a control signal Rx_fine corresponding to the current value of Rx_fine_stop. During the second operational state the value of Rx_fine_stop will increase and decrease until a desired phase relation between Ref_clock and Delay_ref has been achieved. An increase or decrease of Rx_fine_stop will cause a corresponding change of the control signal Rx_fine wherein the setting of the switchable delay elements of the delay line 922 will change.

Similar to the controller 820 the controller 920 may implement lock detection for determining when the first and the second stages of the calibration are complete. When operating in the calibration mode for a first time (e.g. after turning on the power to the system), Rx_fine_start may be initialized to zero. Rx_fine_stop may be initialized to the maximum available value of Rx_fine. Alternatively, Rx_fine_stop may, following determination of Rx_fine_start, be initialized to be equal to Rx_fine_start and thereafter (i.e. during the second operational state) be increased until the desired phase difference between Ref_clock and Delay_ref has been achieved. If calibration is performed additional times, Rx_fine_start and Rx_fine_stop may start from their previously calibrated value. Preferably, calibration is implemented such that Rx_fine_stop>Rx_fine_start upon completion thereof.

According to one embodiment the delay line 922 may be implemented in a same manner as the delay line 322. The delay line 922 may or may not include the varactors 380. Additionally, each variable capacitive load 370 may instead of a varactor include a capacitor having a fixed capacitance. In a first operational state, the controller 920 may disconnect a first number (preferably all) of the varactors of the variable capacitive loads 370 from the output of the associated inverter 360. The controller 920 may thereafter change (e.g. by increasing) the number of connected varactors of the delay line 922 until the total propagation delay of the delay line 922 corresponds to T_ref (or alternatively $I_1$*T_ref/2). The resulting setting of the delay line 922 forms the first setting. The controller 920 may then in a second operational state start from the first setting determined during the first operational state, and change (e.g. by increasing) the number of connected varactors of the variable capacitive loads 370 until the total propagation delay of the delay line 922 corresponds to $I_2$*T_ref (or $I_2$*T_ref/2).

In one embodiment the delay line 122 may be implemented as the delay line 422. The transistors 470a, 470b and 480a, 480b of each delay element may or may not have a tunable limiting current. The discussion in the preceding paragraph applies correspondingly to the present embodiment. However, instead of varying a number of connected varactors, the number of connected transistors 470a, 470b may be varied.

According to one embodiment the controller (e.g. controller 120, 820, 920) may be arranged to estimate the A*τ propagation delay of the delay line resulting for Rx_fine=0 (e.g. in the analog calibration) or for Rx_fine=Rx_fine_start (e.g. in the digital calibration). The propagation delay A*τ may for example be estimated by setting the Tx_coarse to a number which gives a zero phase difference (alternatively 180° for T_ref/2) between Tx_trigg and Rx_trigg when Delay equals zero. The measurement may for example be performed after the calibration is complete. Knowledge of the value of the total propagation delay resulting for Rx_fine=0 or Rx_fine=Rx_fine_start may enable absolute distances to objects to be estimated. With reference to the previous discussion of the system 100 this embodiment may be used for example if the value of A*τ is unknown or not known to an extent which allows for the calibrated value of A*τ to be tied to the integer number $I_1$ of periods or half periods of Ref_clock.

According to a further embodiment, an analog calibration may be combined with a digital calibration. For example, a controller may be arranged to implement an analog calibration of the minimum total propagation delay of a delay line by controlling v_offset (e.g. using the voltage source 842 described in connection with FIG. 8) and implement a digital calibration of the maximum total propagation delay of the delay line by determining Rx_fine_stop (e.g. using the second counter 944 described in connection with FIG. 9). Conversely, the controller may be arranged to implement a digital calibration of the minimum total propagation delay of a delay line by determining Rx_fine_start (e.g. using the first counter 942 described in connection with FIG. 9) and implement an analog calibration of the maximum total propagation delay of the delay line by controlling v_slope (e.g. using the voltage source 842 described in connection with FIG. 8).

Figure 10:
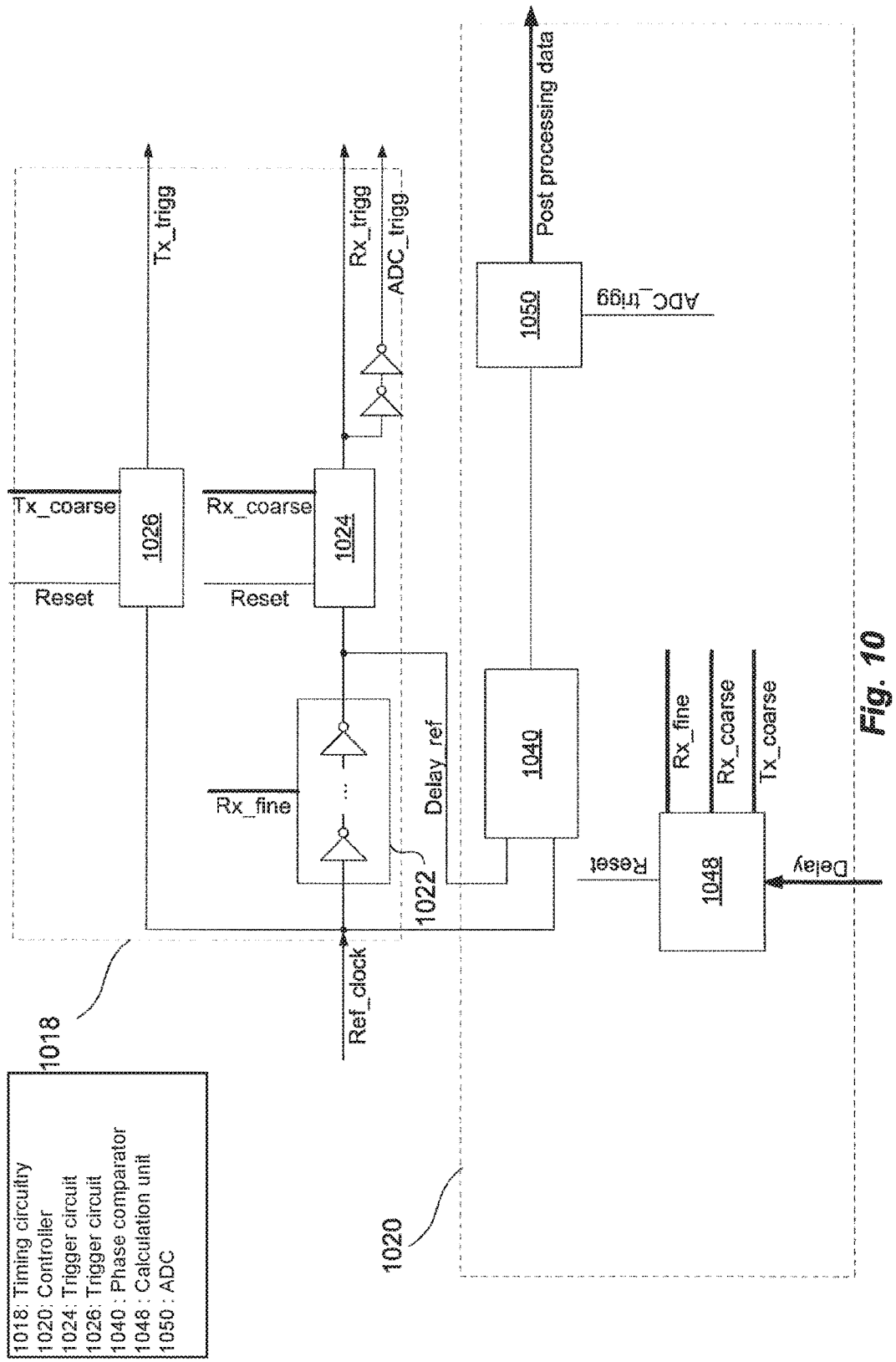
FIG. 10 illustrates an embodiment of a timing circuitry and a controller.

According to one embodiment illustrated in FIG. 10 (wherein elements 1018-1040 and 1048 corresponds to elements 818-840 and 848 in FIGS. 8 and 918-940 and 948 in FIG. 9) the controller 1020 may be arranged to, for each correlation between a reference wavelet and a received wavelet, determine and record a phase difference between Ref_clock and Delay_ref. According to this embodiment, the delay line 1022 is preferably designed to present an adjustment range resulting in the above-described overlap in the digital-to-time transfer function of the timing circuitry 1018. The relevant values of Rx_fine may then be determined during post processing by locating the zero crossing in the phase difference as a function of Rx_fine. As illustrated in FIG. 10 the controller 1020 may include an ADC 1050 arranged to digitize the output signal of the phase comparator 1040 which, as discussed in connection with FIGS. 8 and 9, may represents the determined phase difference The ADC 1050 may be triggered by the trigger signal ADC_trigg. The digitized phase difference may be stored along with the set of correlations resulting from a plurality of correlations between received wavelets and reference wavelets. A range of Rx_fine may thereafter be determined by identifying Rx_fine values for which the phase difference assumes a minimum for one or more settings of Tx_coarse and Rx_coarse. This enables the set of correlation data corresponding to the determined range of Rx_fine to be determined, wherein the correlation data for Rx_fine values outside the determined range may be discarded. By counting the number of Rx_fine points between the two zero crossings, it is possible to estimate the Δt step size.

As may be understood by the skilled person, although in connection with the drawings, certain functions have been described in connection with, or as being performed by, schematic blocks or elements the present inventive concept is not limited to those specific arrangements of the blocks or elements. As understood by the person skilled in the art, unless explicitly stated otherwise, each of the above described circuit elements and components (e.g. the trigger circuits 124, 126, 824, 826, 924, 926, 1024, 1026, the controller 120, 820, 920, 1020 and the elements thereof such as the computation unit 848, 948, 1048, the phase comparator 840, 940, 1040, the calibration control unit 846, 946 etc.) may be implemented using electronic circuitry, one or more field programmable gate arrays (FPGAs), applications specified integrated circuits (ASICs), or the like, wherein the functions of the elements or components may be implemented using a hardware description language (HDL). It is further contemplated that at least some of the functions of the controller 120, 820, 920 and 1020 may be implemented in software instructions wherein a microprocessor or the like may control the operation of the controller by executing the software instructions. Such controllers may for example include digital-to-analog converters for converting values representing parameters such as Rx_fine, Rx_coarse, Tx_coarse etc into control signals which may be provided to the respective timing circuitries.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A transmitter-receiver system comprising:
a transmitter arranged to transmit a wavelet;
a receiver arranged to receive a wavelet;
a wavelet generator arranged to generate a reference wavelet;
timing circuitry arranged to receive a reference clock signal, output a first trigger signal for triggering transmission of a wavelet and output a second trigger signal for triggering generation of a reference wavelet, the timing circuitry comprising a delay line including at least one delay element and being arranged to receive a signal at an input of the delay line and transmit a delayed signal at an output of the delay line, wherein a state of each delay element of at least a subset of said at least one delay elements is switchable between at least a first state and a second state, wherein a delay element in said first state presents a first propagation delay, and a delay element in said second state present a second propagation delay which differs from the first propagation delay by a value which is smaller than a period of the reference clock signal, wherein a total propagation delay of the delay line is configurable by controlling the state of each delay element of said subset; and a controller arranged to control a delay between the first trigger signal and the second trigger signal by controlling the total propagation delay of the delay line;

wherein the receiver further comprises a correlator circuit arranged to correlate the reference wavelet with a received wavelet for at least one setting of the total propagation delay, and wherein the timing circuitry further comprises trigger circuitry arranged to receive, at an input of the trigger circuitry, a clock signal and transmit, at an output of the trigger circuit, the second trigger signal in response to receiving a number of rising and/or falling edges of the clock signal, wherein the controller is arranged to control a delay between the output of the first trigger signal and the second trigger signal by controlling the total propagation delay of the delay line and said number of rising and/or falling edges.

2. A transmitter-receiver system according to claim 1, wherein each delay element comprises a logic circuit element, wherein each delay element of said subset is switchable between at least a first state and a second state by varying a capacitive load of the logic circuit element.

3. A transmitter-receiver system according to claim 1, wherein each delay element comprises a logic circuit element, wherein each delay element of said subset is switchable between at least a first state and a second state by varying a current supplied to the logic circuit element.

4. A transmitter-receiver system according to claim 1, wherein said clock signal received by the trigger circuitry is a delayed reference clock signal transmitted by the delay line.

5. A transmitter-receiver system according to claim 1, wherein the correlator circuit is arranged to, for at least one setting of said number of rising and/or falling edges, correlate a reference wavelet with a received wavelet for a set of different total propagation delays of the delay line.

6. A transmitter-receiver system according to claim 1, wherein the controller is further arranged to control each delay element of said subset of delay elements to said first state and tune the first propagation delay of each delay element of said subset of delay elements such that the total propagation delay of the delay line corresponds to an integer number of periods of the reference clock signal or half periods of the reference clock signal.

7. A transmitter-receiver system according to claim 6, wherein the controller is further arranged to determine a phase difference between the reference clock signal and a delayed reference clock signal output from the delay line, and wherein said tuning is based on the phase difference.

8. A transmitter-receiver system according to claim 6, wherein the controller is further arranged to control each delay element of said subset of delay elements to said second state and tune the second propagation delay of each delay element of said subset of delay elements such that the total propagation delay of the delay line corresponds to an integer number of periods of the reference clock signal or half periods of the reference clock signal.

9. A transmitter-receiver system according to claim 8, wherein the controller is further arranged to determine a phase difference between the reference clock signal and a delayed reference clock signal output from the delay line and tune the second propagation delay of each delay element of said subset of delay elements based on the phase difference.

10. A transmitter-receiver system according to claim 8, wherein the controller is arranged to tune the first and/or the second propagation delay of each delay element of said subset of delay elements using a control signal which is common for the delay elements of said subset.

11. A transmitter-receiver system according to claim 1, wherein the delay line includes an additional delay element having a propagation delay which is tunable, wherein the controller is arranged to control each delay element of said subset of delay elements to said first state and tune the propagation delay of said additional delay element such that the total propagation delay of the delay line corresponds to an integer number of periods of the reference clock signal or half periods of the reference clock signal.

12. A transmitter-receiver system according to claim 1, wherein the controller is arranged to determine a setting of the states of the delay elements of said subset of delay elements, such that a total propagation delay of the delay line corresponds to an integer number of periods of the reference clock signal or half periods of the reference clock signal.

13. A transmitter-receiver system according to claim 1, wherein the controller is arranged to:

determine a first setting of the states of the delay elements of said subset of delay elements, such that a total propagation delay of the delay line corresponds to a first integer number of periods of the reference clock signal or half periods of the reference clock signal, and determine a second setting of the states of the delay elements of said subset of delay elements, such that a total propagation delay of the delay line corresponds to an integer number of periods of the reference clock signal or half periods of the reference clock signal.

14. A transmitter-receiver system according to claim 13, wherein the controller is further arranged to determine a phase difference between the reference clock signal and a delayed reference clock signal output from the delay line and determine said first and/or second settings by repeatedly changing the states of one or more of the delay elements of said subset of delay element based on the determined phase difference.

15. A transmitter-receiver system according to claim 11, wherein the controller is further arranged to control each delay element of said subset of delay elements to said second state and tune the second propagation delay of each delay element of said subset of delay elements such that the total propagation delay of the delay line corresponds to an integer number of periods of the reference clock signal or half periods of the reference clock signal.

16. A transmitter-receiver system comprising:
a transmitter arranged to transmit a wavelet;
a receiver arranged to receive a wavelet;

a wavelet generator arranged to generate a reference wavelet;

timing circuitry arranged to receive a reference clock signal, output a first trigger signal for triggering transmission of a wavelet and output a second trigger signal for triggering generation of a reference wavelet, the timing circuitry comprising a delay line including at least one delay element and being arranged to receive a signal at an input of the delay line and transmit a delayed signal at an output of the delay line, wherein a state of each delay element of at least a subset of said at least one delay elements is switchable between at least a first state and a second state, wherein a delay element in said first state presents a first propagation delay, and a delay element in said second state present a second propagation delay which differs from the first propagation delay by a value which is smaller than a period of the reference clock signal, wherein a total propagation delay of the delay line is configurable by controlling the state of each delay element of said subset; and a controller arranged to control a delay between the first trigger signal and the second trigger signal by controlling the total propagation delay of the delay line;

wherein the receiver further comprises a correlator circuit arranged to correlate the reference wavelet with a received wavelet for at least one setting of the total propagation delay, and wherein the controller is further arranged to control each delay element of said subset of delay elements to said first state and tune the first propagation delay of each delay element of said subset of delay elements such that the total propagation delay of the delay line corresponds to an integer number of periods of the reference clock signal or half periods of the reference clock signal.

17. A transmitter-receiver system according to claim 16, wherein the controller is further arranged to control each delay element of said subset of delay elements to said second state and tune the second propagation delay of each delay element of said subset of delay elements such that the total propagation delay of the delay line corresponds to an integer number of periods of the reference clock signal or half periods of the reference clock signal.

18. A transmitter-receiver system comprising:
a transmitter arranged to transmit a wavelet;
a receiver arranged to receive a wavelet;
a wavelet generator arranged to generate a reference wavelet;
timing circuitry arranged to receive a reference clock signal, output a first trigger signal for triggering transmission of a wavelet and output a second trigger signal for triggering generation of a reference wavelet, the timing circuitry comprising a delay line including at least one delay element and being arranged to receive a signal at an input of the delay line and transmit a delayed signal at an output of the delay line, wherein a state of each delay element of at least a subset of said at least one delay elements is switchable between at least a first state and a second state, wherein a delay element in said first state presents a first propagation delay, and a delay element in said second state present a second propagation delay which differs from the first propagation delay by a value which is smaller than a period of the reference clock signal, wherein a total propagation delay of the delay line is configurable by controlling the state of each delay element of said subset; and a controller arranged to control a delay between the first trigger signal and the second trigger signal by controlling the total propagation delay of the delay line;

wherein the receiver further comprises a correlator circuit arranged to correlate the reference wavelet with a received wavelet for at least one setting of the total propagation delay, and wherein the delay line includes an additional delay element having a propagation delay which is tunable, wherein the controller is arranged to control each delay element of said subset of delay elements to said first state and tune the propagation delay of said additional delay element such that the total propagation delay of the delay line corresponds to an integer number of periods of the reference clock signal or half periods of the reference clock signal.

19. A transmitter-receiver system according to claim 18, wherein the controller is further arranged to control each delay element of said subset of delay elements to said second state and tune the second propagation delay of each delay element of said subset of delay elements such that the total propagation delay of the delay line corresponds to an integer number of periods of the reference clock signal or half periods of the reference clock signal.

20. A transmitter-receiver system comprising:
a transmitter arranged to transmit a wavelet;
a receiver arranged to receive a wavelet;
a wavelet generator arranged to generate a reference wavelet;
timing circuitry arranged to receive a reference clock signal, output a first trigger signal for triggering transmission of a wavelet and output a second trigger signal for triggering generation of a reference wavelet, the timing circuitry comprising a delay line including at least one delay element and being arranged to receive a signal at an input of the delay line and transmit a delayed signal at an output of the delay line, wherein a state of each delay element of at least a subset of said at least one delay elements is switchable between at least a first state and a second state, wherein a delay element in said first state presents a first propagation delay, and a delay element in said second state present a second propagation delay which differs from the first propagation delay by a value which is smaller than a period of the reference clock signal, wherein a total propagation delay of the delay line is configurable by controlling the state of each delay element of said subset; and a controller arranged to control a delay between the first trigger signal and the second trigger signal by controlling the total propagation delay of the delay line;

wherein the receiver further comprises a correlator circuit arranged to correlate the reference wavelet with a received wavelet for at least one setting of the total propagation delay, and wherein the controller is arranged to:
determine a first setting of the states of the delay elements of said subset of delay elements, such that a total propagation delay of the delay line corresponds to a first integer number of periods of the reference clock signal or half periods of the reference clock signal, and
determine a second setting of the states of the delay elements of said subset of delay elements, such that a total propagation delay of the delay line corresponds to an integer number of periods of the reference clock signal or half periods of the reference clock signal.

21. A transmitter-receiver system according to claim 20, wherein the controller is further arranged to determine a phase difference between the reference clock signal and a delayed reference clock signal output from the delay line and determine said first and/or second settings by repeatedly changing the states of one or more of the delay elements of said subset of delay element based on the determined phase difference.

* * * * *